(12) United States Patent
Wu et al.

(10) Patent No.: US 12,131,408 B2
(45) Date of Patent: Oct. 29, 2024

(54) IMAGE RENDERING METHOD AND APPARATUS, DEVICE, AND MEDIUM

(71) Applicant: Beijing Bytedance Network Technology Co., Ltd., Beijing (CN)

(72) Inventors: Jinyuan Wu, Beijing (CN); Jingye Wang, Beijing (CN); Jingjing Zhuge, Beijing (CN); Qi Li, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/545,848

(22) Filed: Dec. 19, 2023

(65) Prior Publication Data

US 2024/0127497 A1 Apr. 18, 2024

Related U.S. Application Data

(63) Continuation of application No. PCT/CN2022/122447, filed on Sep. 29, 2022.

(30) Foreign Application Priority Data

Oct. 13, 2021 (CN) .......................... 202111193061.0

(51) Int. Cl.
*G06T 11/00* (2006.01)
*G06F 3/048* (2013.01)
(Continued)

(52) U.S. Cl.
CPC .......... *G06T 11/001* (2013.01); *G06T 7/0002* (2013.01); *G06T 7/90* (2017.01); *G06T 2207/10024* (2013.01)

(58) Field of Classification Search
CPC .. H04N 5/57–58; H04N 9/64; H04N 21/2381; H04N 21/233; H04N 21/6377;
(Continued)

(56) References Cited

U.S. PATENT DOCUMENTS 9,865,076 B2 * 1/2018 Iwasaki ..................... G06T 1/20
10,950,035 B2 * 3/2021 Harrington ........... G06F 3/0346
(Continued)

FOREIGN PATENT DOCUMENTS

CN 102402792 A 4/2012
CN 110827391 A 2/2020
(Continued)

OTHER PUBLICATIONS

Graphics | Shader, Normal transforms in the unity shader, 2020, 24 pages.
(Continued)

*Primary Examiner* — Wesner Sajous
(74) *Attorney, Agent, or Firm* — Astute IP Law Group

(57) ABSTRACT

An image rendering method and apparatus, a device, and a medium. The method includes: determining a pre-captured initial rendering video stream for a background image; obtaining initial rendering coordinates of each rendering pixel in each initial rendering image frame in the video stream, and obtaining a rendering moment of each initial rendering image frame in the initial rendering video stream; determining the amount of noise of each rendering pixel at the corresponding rendering moment according to the corresponding initial rendering coordinates, a preset noise texture, and the corresponding rendering moment, and obtaining target rendering coordinates of each rendering pixel according to the corresponding amount of noise; and updating the initial rendering coordinates of each rendering pixel according to the corresponding target rendering coordinates to obtain a target rendering image, and rendering the background image according to a target rendering video stream composed of all target rendering images.

18 Claims, 7 Drawing Sheets

(51) Int. Cl.
*G06T 7/00* (2017.01)
*G06T 7/90* (2017.01)
*G06T 11/60* (2006.01)
*G06T 15/40* (2011.01)
*G06T 15/50* (2011.01)
*H04N 19/16* (2014.01)
*H04N 19/46* (2014.01)
*H04N 21/23* (2011.01)
*H04N 21/65* (2011.01)

(58) Field of Classification Search
CPC .. H04N 21/6405; H04N 19/46; H04N 19/436; H04N 19/61; H04N 19/132; H04N 19/172; H04N 9/67; H04N 9/73; G06T 15/00–04; G06T 15/005; G06T 15/405; G06T 15/50; G06T 15/60; G06T 15/80; G06T 13/20; G06T 11/001; G06T 11/60; G06T 1/20; G06T 7/002; G06T 7/90; G06T 2210/52; G06T 2207/10024; G06T 5/70; G06T 15/205; G06T 3/047; G06T 5/00–08; G06T 7/00; G06T 7/40; G06T 7/45; G06T 7/60; G06T 7/80; G06T 7/97; G06T 9/008; G06T 11/40; G06T 2215/00; G06T 2215/12; G06T 2215/16; G06T 2207/00; G06F 3/0346; G06F 3/04842; G06F 17/00; G06F 17/10–12; G06F 7/544; G06F 16/00; G09G 2320/0626; G09G 2320/0666; G09G 2320/0242; G09G 5/02; G09G 5/04; G09G 5/024; G09G 5/026; G09G 5/10; G09G 5/28; G09G 5/30; G09G 5/377; G09G 2320/02; G09G 2320/0209; G09G 2320/0233; G09G 2320/0247
See application file for complete search history.

(56) References Cited

U.S. PATENT DOCUMENTS

| | | | |
|---|---|---|---|
| 2011/0107220 A1* | 5/2011 | Perlman | H04N 21/2381 |
| | | | 715/720 |
| 2014/0035900 A1 | 2/2014 | Slavin, III et al. | |
| 2015/0170408 A1* | 6/2015 | He | G06T 15/005 |
| | | | 345/426 |
| 2016/0174940 A1 | 6/2016 | Schroecker et al. | |
| 2022/0366645 A1* | 11/2022 | Harrington | G06F 3/0346 |

FOREIGN PATENT DOCUMENTS

| | | |
|---|---|---|
| CN | 111145326 A | 5/2020 |
| CN | 112215934 A | 1/2021 |

OTHER PUBLICATIONS

How to Make a Surface Wave Effect, retrieved on 2024, 12 pages.
What is Fresner Effect, 2021, 24 pages.

* cited by examiner

IMAGE RENDERING METHOD AND APPARATUS, DEVICE, AND MEDIUM

CROSS REFERENCE TO RELATED APPLICATIONS

The present application is a continuation of International Patent Application No. PCT/CN2022/122447, filed on Sep. 29, 2022, which claims priority of Chinese Patent Application No. 202111193061.0, titled "IMAGE RENDERING METHOD AND APPARATUS, DEVICE, AND MEDIUM" and filed on Oct. 13, 2021. All the aforementioned patent applications are hereby incorporated by reference in their entireties.

TECHNICAL FIELD

The present disclosure relates to the technical field of image processing, and especially to an image rendering method and apparatus, a device, and a medium.

BACKGROUND

As image processing techniques progress, a common image processing way is to render an effect in a captured image. For example, an effect of water flowing is rendered on a captured ground image, producing an effect of water flowing on the ground.

In a related technique, when adding a water flow to the ground, a water surface texture map of a natural water surface such as a sea or a lake is obtained; a coordinate position of each pixel in the water surface texture that changes over time is computed based on a trigonometric function changing over time; and a water flowing effect is generated based on the coordinate positions.

However, the above way of adding water waves is implemented based on the trigonometric function, and therefore, the water waves exhibit a strong sense of change regularity. For example, as shown in FIG. 1, when adding the water flowing effect, pixels in a water flow model visually flow in a regular trigonometric function waveform, whereas it is impossible for the water waves in a real environment to change regularly. Consequently, this results in less realistic rendering.

SUMMARY

To solve the above technical problem or at least partially solve the above technical problem, the present disclosure provides an image rendering method, comprising: determining an initial rendering video stream for a background image captured in advance, wherein the initial rendering video stream comprises a plurality frames of initial rendering images and each frame of initial rendering image is generated based on a reflection texture and a map texture; obtaining an initial rendering coordinate of each rendering pixel in each frame of initial rendering image, and obtaining a rendering moment of each initial rendering image in the initial rendering video stream; determining an amount of noise of each rendering pixel at the rendering moment based on the initial rendering coordinate, a preset noise texture, and the rendering moment, and performing computing on the amount of noise according to a preset algorithm to obtain a target rendering coordinate of each rendering pixel; and updating the initial rendering coordinate of each rendering pixel in each initial rendering image based on the target rendering coordinate to obtain a target rendering image, and rendering the background image based on a target rendering video stream composed of all target rendering images.

The embodiments of the present disclosure further provide an image rendering apparatus, comprising: a first obtaining module configured to determine an initial rendering video stream for a background image captured in advance, wherein the initial rendering video stream comprises a plurality of initial rendering images and each initial rendering image is generated based on a reflection texture and a map texture; a second obtaining module configured to obtain an initial rendering coordinate of each rendering pixel in each initial rendering image, and obtain a rendering moment of each initial rendering image in the initial rendering video stream; a determination module configured to determine an amount of noise of each rendering pixel at the rendering moment based on the initial rendering coordinate, a preset noise texture, and the rendering moment; a third obtaining module configured to perform computing on the amount of noise according to a preset algorithm to obtain a target rendering coordinate of each rendering pixel; and a rendering module configured to update the initial rendering coordinate of each rendering pixel in each initial rendering image based on the target rendering coordinate to obtain a target rendering image, and render the background image based on a target rendering video stream composed of all target rendering images.

The embodiments of the present disclosure further provide an electronic device, comprising: a processor; and a memory configured to store an instructions executable by the processor, wherein the processor is configured to read the executable instruction from the memory and execute the executable instruction to implement the image rendering method provided by the embodiments of the present disclosure.

The embodiments of the present disclosure further provide a computer-readable storage medium, on which a computer program is stored, wherein the computer program is configured to perform the image rendering method provided by the embodiments of the present disclosure.

The technical solution provided by the embodiments of the present disclosure have following advantages.

The image rendering method of the embodiments of the present disclosure includes: determining the initial rendering video stream for the background image captured in advance, where the initial rendering video stream includes a plurality of initial rendering images and each initial rendering image is generated based on the reflection texture and the map texture; obtaining the initial rendering coordinate of each rendering pixel in each initial rendering image, the preset noise texture, and the rendering moment of each initial rendering image in the initial rendering video stream, and then determining the amount of noise of each rendering pixel at the rendering moment; performing computing on the amount of noise according to the preset algorithm to obtain the target rendering coordinate of each rendering pixel; and finally, updating the initial rendering coordinate of each rendering pixel in each initial rendering image based on the target rendering coordinate to obtain the target rendering image, and rendering the background image based on the target rendering video stream composed of all target rendering images. Thus, the amount of noise is generated based on the noise texture and the rendering moment of the rendering image, and the rendering coordinate is determined based on the amount of noise as a random variable. Thus, a realistic image rendering effect is achieved.

BRIEF DESCRIPTION OF THE DRAWINGS

The above and other features, advantages, and aspects of each embodiment of the present disclosure may become more apparent by combining drawings and referring to the following specific implementation modes. In the drawings throughout, same or similar drawing reference signs represent same or similar elements. It should be understood that the drawings are schematic, and originals and elements may not necessarily be drawn to scale.

DETAILED DESCRIPTION

Figure 1:
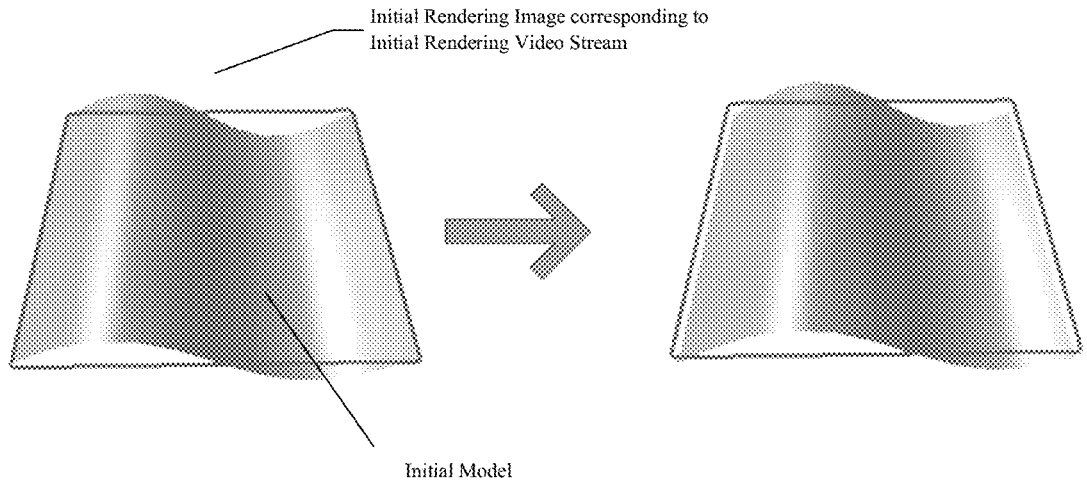
FIG. 1 is a schematic diagram of a flowing scene of a water flow model provided in an embodiment of the present disclosure.

Embodiments of the present disclosure are described in more detail below with reference to the drawings. Although certain embodiments of the present disclosure are shown in the drawings, it should be understood that the present disclosure may be achieved in various forms and should not be construed as being limited to the embodiments described here. On the contrary, these embodiments are provided to understand the present disclosure more clearly and completely. It should be understood that the drawings and the embodiments of the present disclosure are only for exemplary purposes and are not intended to limit the scope of protection of the present disclosure.

It should be understood that various steps recorded in the implementation modes of the method of the present disclosure may be performed according to different orders and/or performed in parallel. In addition, the implementation modes of the method may include additional steps and/or steps omitted or unshown. The scope of the present disclosure is not limited in this aspect.

The term "including" and variations thereof used in this article are open-ended inclusion, namely "including but not limited to". The term "based on" refers to "at least partially based on". The term "one embodiment" means "at least one embodiment"; the term "another embodiment" means "at least one other embodiment"; and the term "some embodiments" means "at least some embodiments". Relevant definitions of other terms may be given in the description hereinafter.

It should be noted that concepts such as "first" and "second" mentioned in the present disclosure are only used to distinguish different apparatuses, modules or units, and are not intended to limit orders or interdependence relationships of functions performed by these apparatuses, modules or units.

It should be noted that modifications of "one" and "more" mentioned in the present disclosure are schematic rather than restrictive, and those skilled in the art should understand that unless otherwise explicitly stated in the context, it should be understood as "one or more".

The names of messages or information exchanged among multiple devices in the embodiment of this disclosure are only used for illustrative purposes, and are not used to limit the scope of these messages or information.

In order to solve the above problem, the embodiments of the present disclosure provide an image rendering method, and in the image rendering method, the background image is rendered combined with a random variable, and therefore the irregular change of rendering coordinate in the rendered image can better simulate the random conditions in the natural environment; for example, it can better simulate the fluctuation of water flow under natural conditions, and the natural feeling of water flow fluctuation is stronger. This method will be introduced with specific examples as below.

Figure 2:
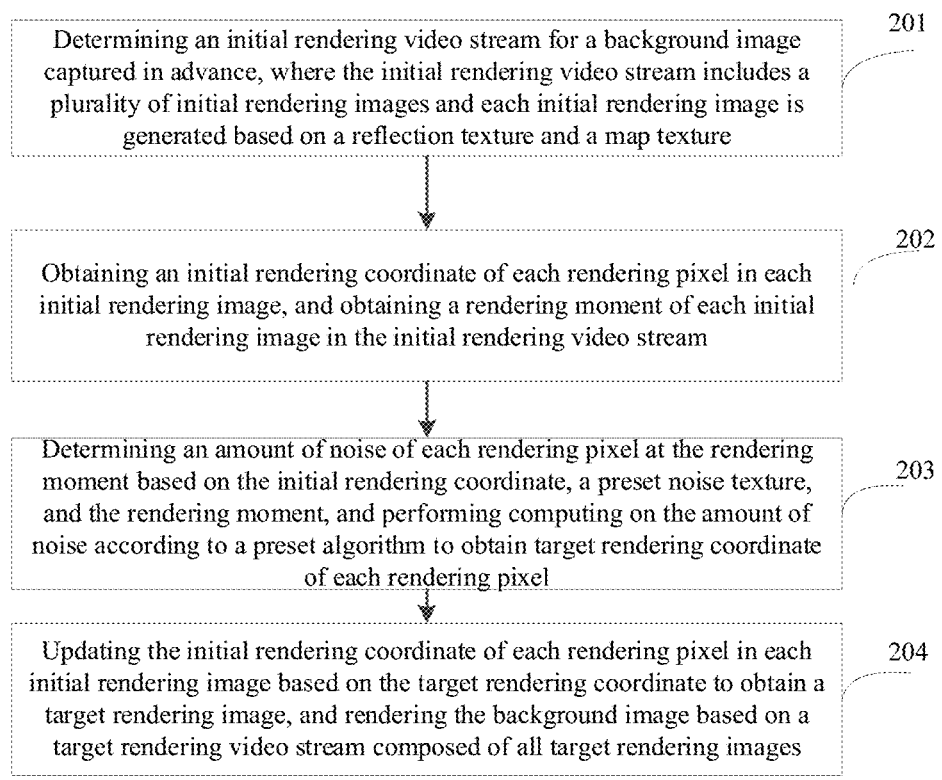
FIG. 2 is a flowchart of an image rendering method provided in an embodiment of the present disclosure.

FIG. 2 is a flowchart of an image rendering method provided in an embodiment of the present disclosure. The image rendering method may be performed by an image rendering apparatus which may be implemented by software and/or hardware and may be generally integrated in an electronic device. As shown in FIG. 2, the image rendering method includes the following steps.

Step 201, determining an initial rendering video stream for a background image captured in advance, where the initial rendering video stream includes a plurality of initial rendering images and each initial rendering image is generated based on a reflection texture and a map texture.

The background image is a background texture captured by any camera and desired to be added with an effect. For example, the background image may be an indoor floor image. Thus, a water flow or the like may be rendered in the floor image. For another example, the background image may be a sky image. Thus, snow or the like may be rendered in the sky image.

In the present embodiment, the initial rendering video stream is added to the background image, where the initial rendering video stream includes a plurality of initial rendering images corresponding to initial models of effects to be added, and each initial rendering image includes an initial model image. Coordinate positions of rendering pixels of images of the initial models corresponding to different initial rendering images are different, and therefore, continuous playing of the plurality of initial rendering images produces a rendering effect such as a water flow. The initial rendering video stream may be any video stream generated according to a generation function and having relatively regular coordinate position changes. For example, the initial rendering video stream may be a water flow model generated according to a trigonometric sine function, and for another example, may be a snow model generated according to a linear function. Each initial rendering image generated according to the corresponding function is merely used to control the position changes of the rendering pixels corresponding to each initial rendering image. Therefore, to further improve the realistic effect. Furthermore, colors of rendering pixels are generated based on the reflection texture and the map texture, where the map texture may be a sea water surface map or the like, and the reflection texture may be preset and used to simulate, together with the map texture, a water surface effect of glistening after reflection by the sea water surface.

To provide a clear understanding of the process of adding each initial rendering image to the background image for a person skilled in the art, the process of generating each initial rendering image is described below by taking for example that when the added initial rendering video stream is the water flow, the initial model generated according to a trigonometric function is the water flow model.

Figure 3:
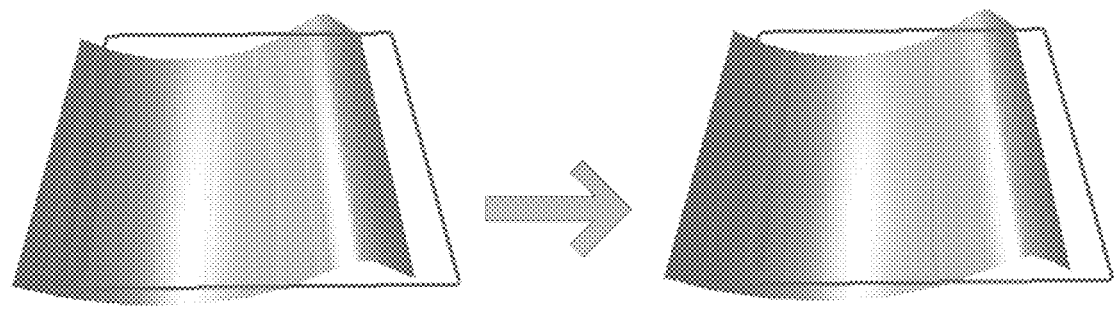
FIG. 3 is a schematic diagram of flowing of another water flow model provided in an embodiment of the present disclosure.

In this example, to simulate the wave effect in reality, firstly, the y-coordinate of a vertex in the initial model corresponding to water waves needs to be deviated, and it is desired that the y-coordinate can change smoothly over time to form a curve of a wave. Thus, naturally, the effect can be achieved by using the trigonometric function (sin or cos function). However, an ordinary sine wave cannot completely reflect the waving of the water surface and fails to depict the effect of the water surface going forward and backward along with the waves. Here, the x coordinate of the vertex in the initial model corresponding to water waves may also be changed. The achieved effect is as shown in FIG. 3. The wave flowing effect can be intuitively seen over time, where the images corresponding to the wave flowing effect are the above-mentioned rendering images.

Figure 4:
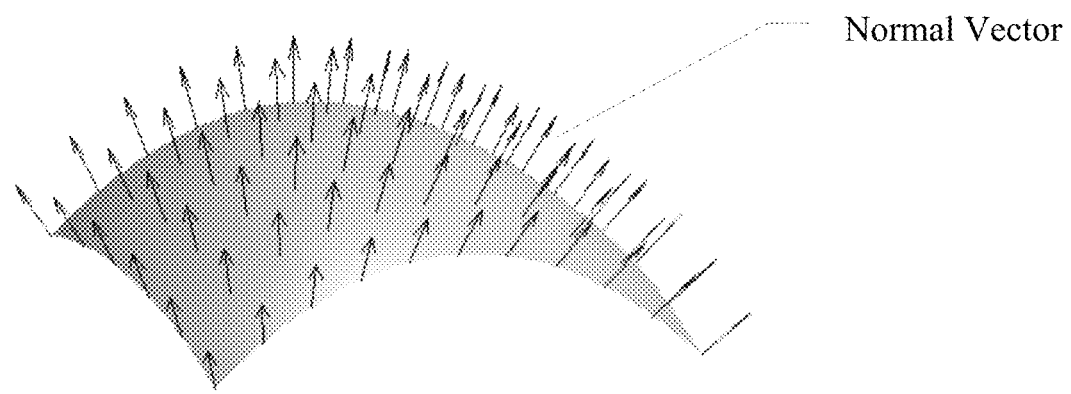
FIG. 4 is a schematic diagram of a surface normal vector of an object provided in an embodiment of the present disclosure.
Figure 5:
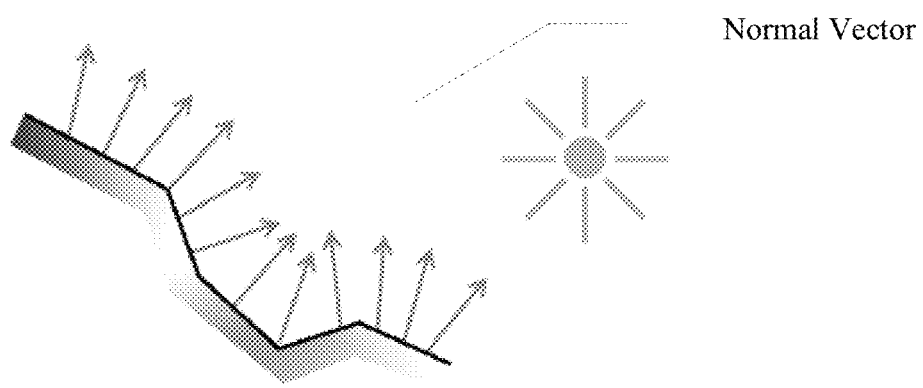
FIG. 5 is a schematic diagram of a relationship between a normal vector and a light source provided in an embodiment of the present disclosure.

Further, to embody the concave-convex details on the wave surface when the water waves flow, the corresponding map texture is added to the water surface. During actual addition, a surface normal direction of the water surface may be recorded on the normal map texture. As shown in FIG. 4, the surface normal of an object is a vector perpendicular to a tangent plane. To put it simply, the surface normal is a vector, which is perpendicular to a network at a given vertex, namely a rendering pixel vertex. With reference to FIG. 5, each normal vector points to the outside of a light source, following the completely curved shape of a surface grid of the object. Such illumination may be simulated by performing normal mapping based on the map texture.

During shading, these normal vectors are used to compute illumination on each rendering pixel. In this way, the concave-convex details of the water surface can be increased without increasing the number of vertexes of the initial model. Thus, the normal vector on each rendering pixel is transformed into a world coordinate system by using a TBN matrix or the like in a fragment shader, and then shading computing is performed, thereby embodying the concave-convex details of the water surface. In the present embodiment, to simulate the diffuse reflection effect of the real water surface during flowing, the reflection and a surface color of the water surface are exhibited by reflection texture mapping. It will also be understood that the color and the intensity shown by the water surface when exposed to a light source are exhibited by the reflection texture. In the present embodiment, the reflection texture is plotted in advance with the color and light and shade changes, and the color and the light and shade changes of the water surface are simulated based on the addition of the reflection texture.

Step 202, obtaining an initial rendering coordinate of each rendering pixel in each initial rendering image, and obtaining a rendering moment of each initial rendering image in the initial rendering video stream.

In the present embodiment, an initial coordinate point of the initial model of rendering is the initial rendering coordinate of each rendering pixel. In the present embodiment, the initial rendering coordinate of each rendering pixel in each initial rendering image are obtained according to the generation function of the initial model or the like.

The rendering moment in the present embodiment may be construed as a changing moment corresponding to each initial rendering image when the initial rendering video stream changes in the coordinate with a time parameter.

Step 203, determining an amount of noise of each rendering pixel at the rendering moment based on the initial rendering coordinate, a preset noise texture, and the rendering moment, and performing computing on the amount of noise according to a preset algorithm to obtain target rendering coordinate of each rendering pixel.

Figure 7:
FIG. 7 is a schematic diagram of a noise texture provided in an embodiment of the present disclosure.

In the present embodiment, the preset noise texture is obtained, which is generated by a random variable. For example, the noise texture is composed of 256 random direction unit vectors. In a possible implementation, the noise texture is as shown in FIG. 7, and the noise texture provides a random variable for adding a random disturbance effect for each initial rendering image.

As mentioned above, the rendering moment may be construed as the changing moment corresponding to each initial rendering image when the initial rendering video stream changes in the coordinate with the time parameter. In the present embodiment, to further improve the realistic effect of each initial rendering image, the rendering moment is used as another random variable.

In the present embodiment, the amount of noise of each rendering pixel at the rendering moment is determined based on the initial rendering coordinate, the preset noise texture, and the rendering moment, so that the coordinate of each rendering pixel can be further updated based on the amount of noise.

It needs to be noted that in different application scenarios, the ways of determining the amount of noise of each rendering pixel at the rendering moment based on the initial rendering coordinate, the preset noise texture, and the rendering moment are different, which will be described below by ways of example.

Example I

In this example, a point is randomly sampled from the noise texture according to a random algorithm to obtain a random amount of noise, and after summing computing based on the rendering moment and the initial rendering coordinate, a product value of a summing result and the random amount of noise is used as the amount of noise.

Example II

In this example, a fifth sampling coordinate is determined based on the initial rendering coordinate and the rendering moment, and a noise texture vector corresponding to the fifth sampling coordinate is determined in the noise texture as the amount of noise.

For example, summing is performed based on the initial rendering coordinate and the rendering moment, and summing results are normalized to obtain the fifth sampling coordinate.

For another example, the fifth sampling coordinate is obtained according to the following formula (1), where U1 represents the fifth sampling coordinate; U0 represents the initial rendering coordinate; U0 represents a vector including two elements: image coordinate u and v; and t represents the rendering moment. The formula (1) is as shown below:

$$U1 = f(U0 \times 0.05 + t \times (0.02, 0.02)) \quad (1)$$

Further, computing is performed on the amount of noise according to the preset algorithm to obtain the target rendering coordinate of each rendering pixel, where two random disturbance factors, namely the rendering moment and the noise texture, are taken into account for the target rendering coordinate, such that the target rendering coordinate exhibit a more natural model change.

It needs to be noted that in different application scenarios, the ways of performing computing on the amount of noise according to a preset algorithm to obtain the target rendering coordinate of each rendering pixel are different, which are described below by way of example.

In one embodiment of the present disclosure, a preset noise factor is obtained; a product value of the noise factor and the amount of noise is computed; and a sum of the product value and the corresponding rendering pixel is computed to obtain the target rendering coordinate of each rendering pixel.

In another embodiment of the present disclosure, the target rendering coordinate of each rendering pixel is determined based on the initial rendering coordinate, a first direction vector, a second direction vector, a binormal vector, and the amount of noise.

In the present embodiment, a first direction vector of preset simulated light emission of each rendering pixel, a second direction vector between each rendering pixel and a camera capturing the background image, and a binormal vector of each rendering pixel in a world space are obtained.

During normal mapping, since the illumination of a light source needs to be simulated, in the present embodiment, when generating the initial rendering images corresponding to the initial rendering video stream, to improve the realistic effect, a light emission direction is also simulated to add the light source; therefore, in the present embodiment, the first direction vector of the simulated light emission of each rendering pixel is obtained, and the first direction vector may be construed as a direction vector of emission of light. The light sources of different rendering pixels may correspond to a same first direction vector or different first direction vectors. In some possible embodiments, when generating each initial rendering image, this may be completed by using a fragment rendering shader. Therefore, the first direction vector may be read from the fragment rendering shader.

In addition, during reflection texture mapping, to simulate the color and the light and shade changes, a viewing direction of human eyes relative to the initial model corresponding to the initial rendering video stream needs to be simulated because the corresponding rendering pixels in the initial mode viewed by human eyes in different viewing directions are different in light and shade as well as color. In the present embodiment, a line-of-sight direction of viewing by a user is simulated based on the second direction vector between the camera capturing the background image and the initial rendering coordinate of each rendering pixel in each initial rendering image.

Figure 6:
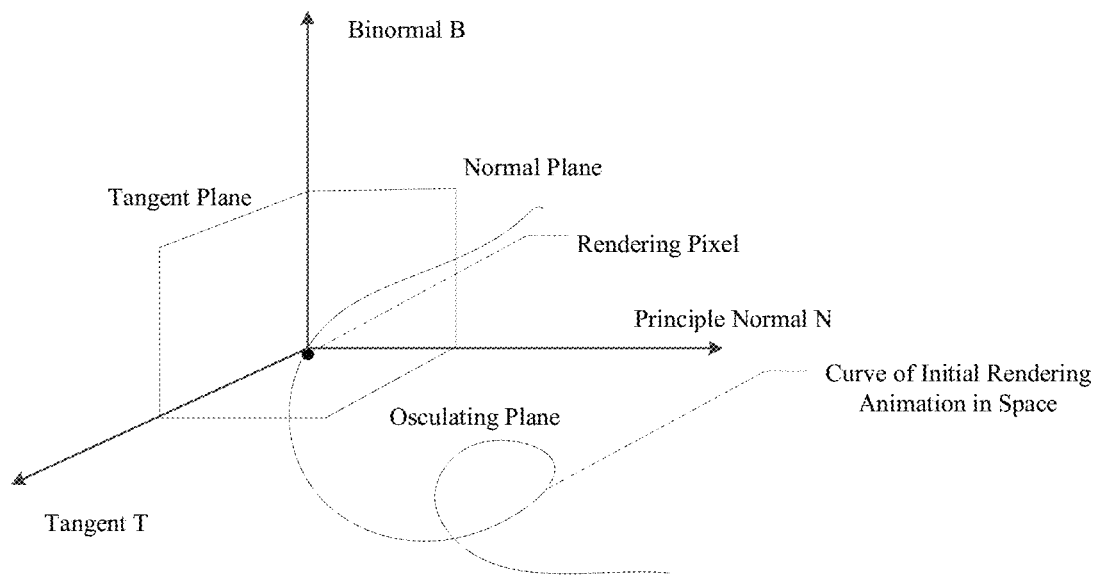
FIG. 6 is a schematic diagram of a binormal vector provided in an embodiment of the present disclosure.

When adding the map texture, as shown in FIG. 6, a normal vector is determined based on a tangent plane of the initial model. When determining the normal vector based on the tangent plane, a binormal vector may also be determined based on the tangent plane, and the binormal vector is a straight line perpendicular to an osculating plane of the initial model. In the present embodiment, the binormal vector of each rendering pixel in the world space is further obtained, where the binormal vector may be preset, or may be read from a corresponding fragment shader.

In the present embodiment, after the amount of noise generated based on two random variables is obtained, the target rendering coordinate of each rendering pixel are determined based on the initial rendering coordinate, the first direction vector, the second direction vector, the binormal vector, and the amount of noise, where the first direction vector, the second direction vector, and the binormal vector are used to guarantee that the action of light is taken into account for the target rendering coordinate.

It needs to be noted that in different application scenarios, the ways of determining the target rendering coordinate of each rendering pixel based on the initial rendering coordinate, the first direction vector, the second direction vector, the binormal vector, and the amount of noise are different, which will be described below by ways of example.

Example I

In this example, a product of the binormal vector and the first direction vector and a product of the binormal vector and the second direction vector are computed; moduli of the two products are summed to serve as an input parameter to the generation function for each initial rendering image to obtain a corresponding function value; and then a product value of the function value and the amount of noise is computed, and results of summing the product value and the initial rendering coordinate is used as the target rendering coordinate.

Example II

Figure 8:
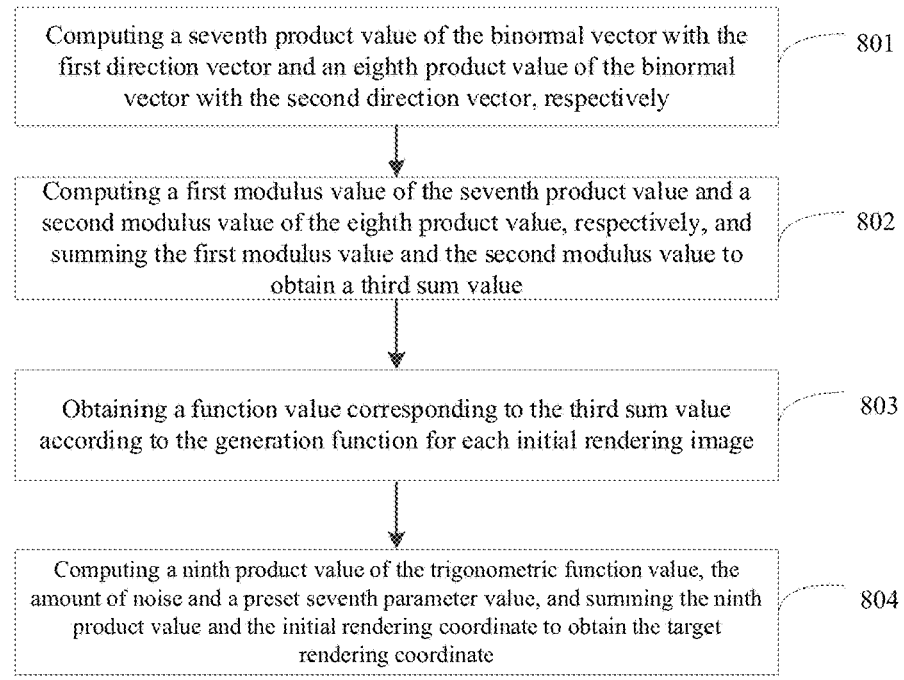
FIG. 8 is a flowchart of another image rendering method provided in an embodiment of the present disclosure.

In this example, as shown in FIG. 8, determining the target rendering coordinate of each rendering pixel based on the initial rendering coordinate, the first direction vector, the second direction vector, the binormal vector, and the amount of noise includes the following steps.

Step 801, computing a seventh product value of the binormal vector with the first direction vector and an eighth product value of the binormal vector with the second direction vector, respectively.

In the present embodiment, the seventh product value of the binormal vector and the first direction vector and the eighth product value of the binormal vector and the second direction vector are computed.

Step 802, computing a first modulus value of the seventh product value and a second modulus value of the eighth product value, respectively, and summing the first modulus value and the second modulus value to obtain a third sum value.

In the present embodiment, the first modulus value of the seventh product value and the second modulus value of the eighth product value are computed, and the first modulus value and the second modulus value are summed to obtain the third sum value.

Step 803, obtaining a function value corresponding to the third sum value according to the generation function for each initial rendering image.

In the present embodiment, the generation function for each initial rendering image may be any function. For example, in the case where each initial rendering image belongs to a video stream corresponding to the water flow, the generation function may be trigonometric sin function, or trigonometric cos function, or the like.

In the present embodiment, the third sum value is used as the input parameter to the generation function to obtain the corresponding function value. Thus, the target rendering coordinate is subsequently computed on the basis of the generation function for the coordinate change of each initial rendering image, avoiding that the change of the target rendering coordinate is too random, causing the rendering effect to be less realistic.

Step 804, computing a ninth product value of the trigonometric function value, the amount of noise and a preset seventh parameter value, and summing the ninth product value and the initial rendering coordinate to obtain the target rendering coordinate.

In the present embodiment, the ninth product value of the trigonometric function value, the amount of noise, and the preset seventh parameter value is computed, and the ninth product value and the initial rendering coordinate is summed to obtain the target rendering coordinate.

By way of example, in the case where the generation function for each initial rendering image is the trigonometric sin function, a computing formula for the target rendering coordinate in the present embodiment is as shown in the following formula (2). In the formula (2), U represents the target rendering coordinate; S1 represents the seventh parameter value pre-calibrated based on experimental data; N1 represents the amount of noise; U0 represents the initial rendering coordinate; B represents the binormal vector; L represents the first direction vector; and V represents the second direction vector.

$$U = U0 + S1 \times N1 \times \sin(|B \times L| + |V \times B|) \tag{2}$$

Step 204, updating the initial rendering coordinate of each rendering pixel in each initial rendering image based on the target rendering coordinate to obtain a target rendering image, and rendering the background image based on a target rendering video stream composed of all target rendering images.

In the present embodiment, after the target rendering coordinate is obtained, the initial rendering coordinate of each rendering pixel in each initial rendering image is updated based on the target rendering coordinate to obtain the target rendering image. Thus, updating of the u and v coordinates of each rendering pixel is realized. The background image is rendered based on the target rendering video stream composed of all target rendering images. Random disturbance factors of multiple dimensions are added. When the related model of rendering is the water flow model, the random disturbance factor amount of noise is added, producing a natural rippling effect and hence a good realistic effect.

To sum up, the image rendering method of the embodiments of the present disclosure includes: determining the initial rendering video stream for the background image captured in advance, where the initial rendering video stream includes a plurality of initial rendering images and each initial rendering image is generated based on the reflection texture and the map texture; obtaining the initial rendering coordinate of each rendering pixel in each initial rendering image, the preset noise texture, and the rendering moment of each initial rendering image in the initial rendering video stream, and then determining the amount of noise of each rendering pixel at the rendering moment; performing computing on the amount of noise according to the preset algorithm to obtain the target rendering coordinate of each rendering pixel; and finally, updating the initial rendering coordinate of each rendering pixel in each initial rendering image based on the target rendering coordinate to obtain the target rendering image, and rendering the background image based on the target rendering video stream composed of all target rendering images. Thus, the amount of noise is generated based on the noise texture and the rendering moment of the rendering image, and the rendering coordinate is determined based on the amount of noise as a random variable. Thus, a realistic image rendering effect is achieved.

Figure 9:
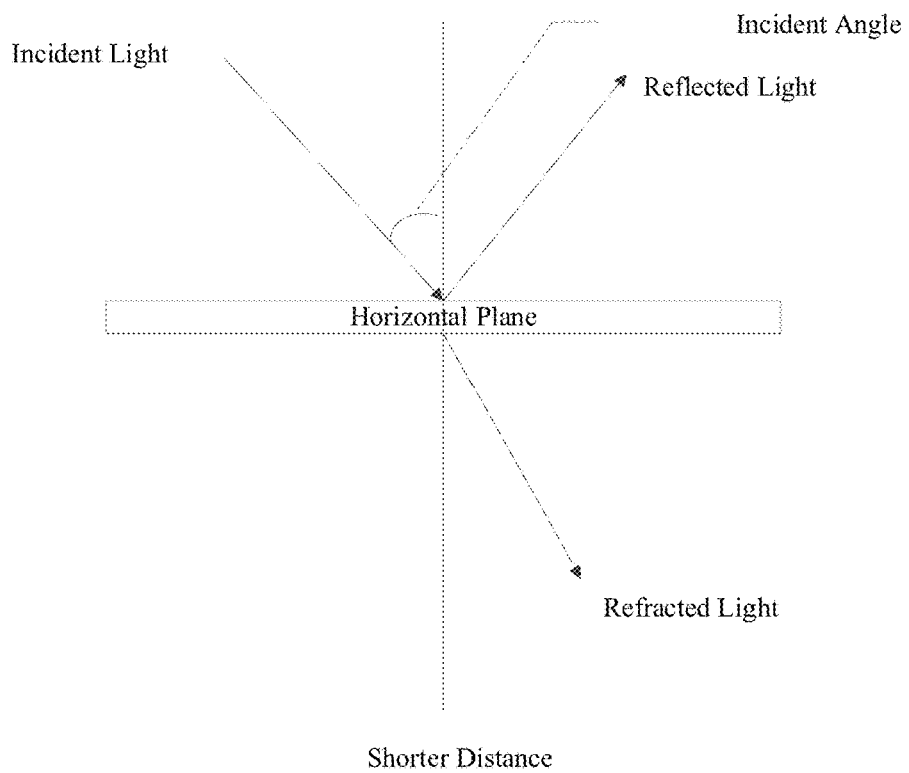
FIG. 9 is a schematic diagram of a Fresnel effect provided in an embodiment of the present disclosure.

In actual execution process, when adding a rendering effect to the background image, to make the added effect more realistic, Fresnel effect should also be considered. The Fresnel effect refers to that a material exhibits different reflection effects at different distances. As shown in FIG. 9, taking for example that the added initial model of rendering is water flow, the Fresnel effect refers to that: a light ray is emitted from the eyes of a viewer (which may also be a camera) toward a certain object and an acute angle formed between the ray of light and a tangent line at an intersection point with the horizontal plane is an angle of incidence. The angle of incidence has two important characteristics: first, the angle of incidence changes with the change of a viewing distance: the shorter the distance, the larger the angle of incidence; and the greater the distance, the smaller the angle of incidence; second, the size of the angle of incidence affects the reflection effect: the larger the angle of incidence, the weaker the reflection effect; and the smaller the angle of incidence, the stronger the reflection effect.

When reflected to the water flow in reality, for a rendering pixel at a position closer to the camera, the angle of incidence is larger and therefore the reflection effect is weaker; and for a rendering pixel at a position farther away from the camera, the angle of incidence is smaller and therefore the reflection effect is stronger. The more transparent the water looks like, e.g., like air, the stronger the reflection effect, and the smoother the water looks like, e.g., like a mirror. Such a change in reflection effect/definition with distance changing is called Fresnel effect.

As a matter of course, in a real environment, the light rays entering human eyes are affected by refracted light in addition to reflected light, where the reflected light includes diffuse reflection and specular reflection. The diffuse reflection refers to that when the surface of the initial model of rendering is rough, we regard the surface of the initial model as countless tiny mirrors in different directions, and the light rays reflected by these mirrors are in different directions. This is called diffuse reflection. The specular reflection refers to that assuming that the surface of the initial model of rendering is smooth and there is only one mirror, all light rays are reflected in the same direction (actually light rays taking the shortest time are similar in phase). This is called specular reflection. Therefore, in the present embodiment, to show the realistic Fresnel effect, the color of each rendering pixel is determined by performing Fresnel fusion of the refracted light, the reflected light and the specular highlight. Thus, the initial model after the color rendering is made more realistic, and the rendering effect is caused to be clear at a short distance and fuzzy at a long distance. When rendering with water waves, the realistic effect of water surface waving can be further improved.

Figure 10:
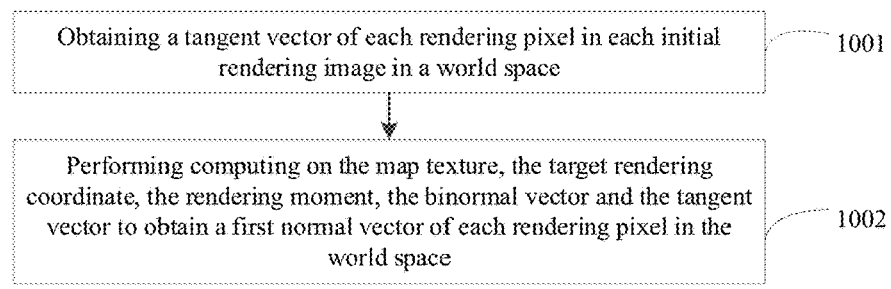
FIG. 10 is a flowchart of another image rendering method provided in an embodiment of the present disclosure.

FIG. 10 is a flowchart of an image rendering method according to one embodiment of the present disclosure. As shown in FIG. 10, the image rendering method includes the following steps.

Step 1001, obtaining a tangent vector of each rendering pixel in each initial rendering image in a world space.

Step 1002, performing computing on the map texture, the target rendering coordinate, the rendering moment, the binormal vector and the tangent vector to obtain a first normal vector of each rendering pixel in the world space.

Figure 11:
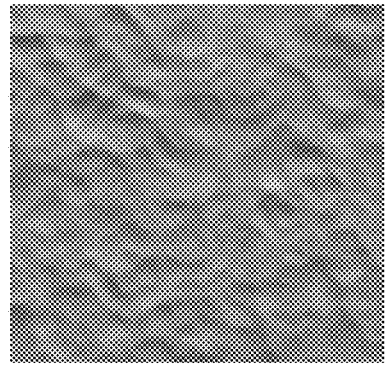
FIG. 11 is a schematic diagram of a map texture provided in embodiment of the present disclosure.

In the present embodiment, as mentioned above, the map texture refers to that the concave-convex effect of the surface of an object is simulated based on the normal vector to simulate the reflection of illumination of a light source by the initial model. As shown in FIG. 11, when the initial model of the target rendering video stream is water flow, the corresponding map texture may reflect the concave-convex effect of light illumination on the water surface. A coordinate system for a vector representing the normal direction in the map texture is as follows: the X-axis direction is (1, 0, 0), the Y-axis direction is (0, 1, 0), and the Z-axis direction is (0, 0, 1), which may also be construed as a tangent coordinate system of texture.

That is to say, the normal vector in the normal texture map is in the tangent coordinate system. The advantage of doing so is that when texture fits the initial model for rendering, regardless of rotation and transformation of the initial model corresponding to an effect, the normal vector does not change because the normal texture map is represented by the tangent coordinate system of texture. Otherwise, if the normal vector is represented by a world coordinate system, the information in the normal direction may change with different directions of the initial model, and it is impossible to represent the normal vectors corresponding to all the initial model directions using one normal texture map.

To represent the normal vector with the tangent coordinate system, what needs to be done in shading is to transform the normal from the tangent coordinate system into the world coordinate system. However, it is likely that the directions of the X-axis, the Y-axis, and the Z-axis of the tangent coordinate system have not been (1, 0, 0), (0, 1, 0), and (0, 0, 1) during rendering unless the initial model itself is a plane, the normal direction of the initial model is the forward direction of the Z-axis, and the directions of two edges of the initial model just coincide with the X-axis and the Y-axis. That is to say, the tangent coordinate system of the normal vectors of the pixels of the map texture have changed after the map fits the initial model. Therefore, the current tangent coordinate system of the pixels needs to be solved.

Therefore, in the present embodiment, the tangent vector of each rendering pixel in each initial rendering image in the world space needs to be obtained. Since the tangent vector of each rendering pixel in the initial model has a small change as compared with the tangent vector of each rendering pixel in each initial rendering image, the tangent vector of each rendering pixel in each initial rendering image is used as the tangent vector of each rendering pixel in the target rendering image in the present embodiment.

Figure 12:
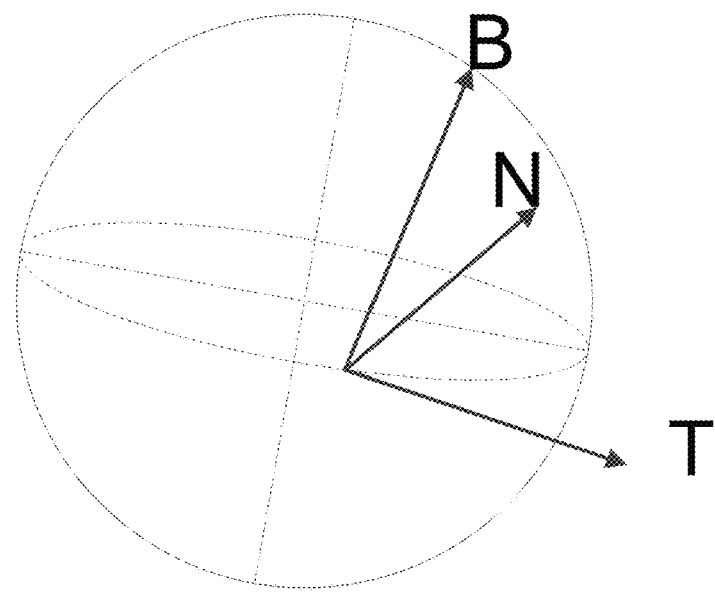
FIG. 12 is a schematic diagram of a tangent vector direction provided in an embodiment of the present disclosure.

The coordinate space where the normal vector of the map texture is located may be regarded as a coordinate system, and any point in the coordinate space can be defined as long as three orthogonal coordinate axes XYZ as basic axes. A tangent space is a space over the surface of the initial model. The X-, Y-, and Z-axes in the tangent space are T-axis (in the tangent direction), B-axis (binormal direction), and N-axis. The N-axis represents the normal vector direction of a point, and it is confirmed that the forward direction of the Z-axis of the tangent space is the same as the direction of the normal n. There is only one tangent at a certain point in a curve, but there is a tangent plane at a certain point in a curved surface, and there are countless tangents because any line passing through the point in the plane is the tangent of the point. There are many different combinations of the X-axis and the Y-axis, and the point normal generated by each combination is consistent. In the present embodiment, the direction the same as the uv unfolding direction is selected as a tangential direction when computing the tangent vector T in the tangential direction. As shown in FIG. 12, when the initial model corresponding to the target rendering video stream is a sphere, the tangent vector T is as shown in the figure.

In the present embodiment, the tangent vector of each rendering pixel in the tangential direction may be read based on the fragment shader or the like, and may also be pre-calibrated based on a generation tool for the initial model, etc.

Further, as described above, to represent the normal vector with the tangent coordinate system, what needs to be done in shading is to transform the normal from the tangent coordinate system into the world coordinate system. Therefore, the first normal vector of each rendering pixel in the world space is further obtained. The first normal vector may be construed as a shading normal vector of the map texture in the world space.

It needs to be noted that in different application scenarios, the ways of performing computing on the map texture, the target rendering coordinate, the rendering moment, and the binormal vector and the tangent vector in the world space to obtain the first normal vector of each rendering pixel in the world space are different, which will be described below by ways of example.

Example I

In this example, sampling coordinate is obtained based on the target rendering coordinate and the rendering moment; a random texture vector is collected from the map texture based on the sampling coordinate; and world coordinate transformation is performed based on the random texture vector and the tangent vector to obtain the corresponding first normal vector.

In this example, a world coordinate transformation model may be constructed in advance, and transformation is performed based on the world coordinate transformation model to obtain the first normal vector corresponding to the random texture vector and the tangent vector.

Example II

Figure 13:
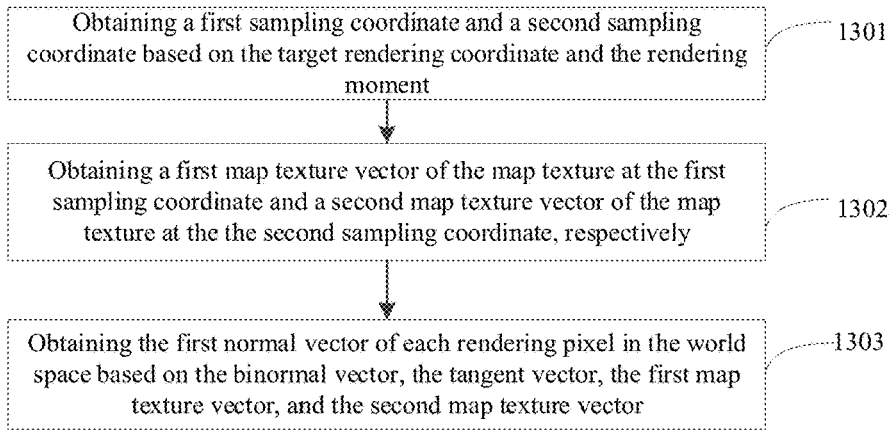
FIG. 13 is a flowchart of another image rendering method provided in an embodiment of the present disclosure.

In this example, as shown in FIG. 13, the first normal vector is obtained by the following steps.

Step 1301, obtaining a first sampling coordinate and a second sampling coordinate based on the target rendering coordinate and the rendering moment.

In the present embodiment, the first sampling coordinate and the second sampling coordinate is obtained based on the target rendering coordinate and the rendering moment so as to sample in the map texture based on the sampling coordinate.

In some possible implementations, the first sampling coordinate and the second sampling coordinate may be computed by the following formula (3) and formula (4). In the formula (3) and the formula (4), parameter values such as 0.46/1.0 are parameter values with good effect obtained based on experimental data, and other parameter values may also achieve the effect of the present disclosure, which will not be listed one by one here. In the formula (3) and the formula (4), U2 represents the first sampling coordinate; U3 represents the second sampling coordinate; U represents the target rendering coordinate; and t represents the rendering moment.

$$U2=f(U+t\times(0.46,0.16))\times(1.0,1.2) \quad (3)$$

$$U3=f(U+t\times(-0.32,0.2))\times(1.4,1.7) \quad (4)$$

In some other implementations, product values of the target rendering coordinate and the rendering moment are computed; sums of the product values with two different preset parameter values are computed; and the resulting two sum values are normalized to obtain the corresponding first sampling coordinate and the second sampling coordinate.

Step 1302, obtaining a first map texture vector of the map texture at the first sampling coordinate and a second map texture vector of the map texture at the second sampling coordinate, respectively.

In the present embodiment, the first map texture vector corresponding to the first sampling coordinate is obtained from the map texture, and the second map texture vector corresponding to the second sampling coordinate is obtained from the map texture.

Step 1303, obtaining the first normal vector of each rendering pixel in the world space based on the binormal vector, the tangent vector, the first map texture vector, and the second map texture vector.

In some possible embodiments, a mean value of the first map texture vector and the second map texture vector is computed to obtain the second normal vector in the tangent space. For example, when the first map texture vector is N1 and the second map texture vector is N2, (N1+N2)*0.5 is taken as the second normal vector.

Further, normalization computing is performed based on the binormal vector and the tangent vector to obtain a third normal vector in the world space. For example, when the binormal vector is B, the tangent vector is T, and G ( ) is the preset normalization computing algorithm, the value of G(B*T) can be taken as the third normal vector.

In the present embodiment, a vector transformation matrix M=(T, B,) is obtained based on the binormal vector, the tangent vector, and the third normal vector. Thus, after the vector transformation matrix is obtained, a product of the vector transformation matrix and the second normal vector is computed to obtain the first normal vector. That is, the first normal vector is computed by the following formula (5), where the first normal vector is a normal vector in the world space; N s represents the first normal vector; M represents the vector transformation matrix; and $N_t$ represents the second normal vector.

$$N_s=M\times N_t \quad (5)$$

Step 1003, computing a rendering color vector of each rendering pixel based on the first normal vector, the first direction vector, and the second direction vector.

Step 1004, rendering a color of a corresponding rendering pixel in the target rendering image based on the rendering color vector.

In the present embodiment, the rendering color vector of each rendering pixel is computed based on the first normal vector, the first direction vector, and the second direction vector, where the first normal vector reflects the concave-convex effect of illumination in the map texture, and the first direction vector and the second direction vector reflect a line-of-sight direction and a light direction. Therefore, the rendering color vector reflects a color exhibited by the corresponding rendering pixel after reflection, refraction, or specular reflection of the light source.

In some possible implementations, a deep learning model may be trained in advance according to a deep learning technique, and the first normal vector, the first direction vector, and the second direction vector are input to the deep learning model to obtain the rendering color vector of each rendering pixel.

Figure 14:
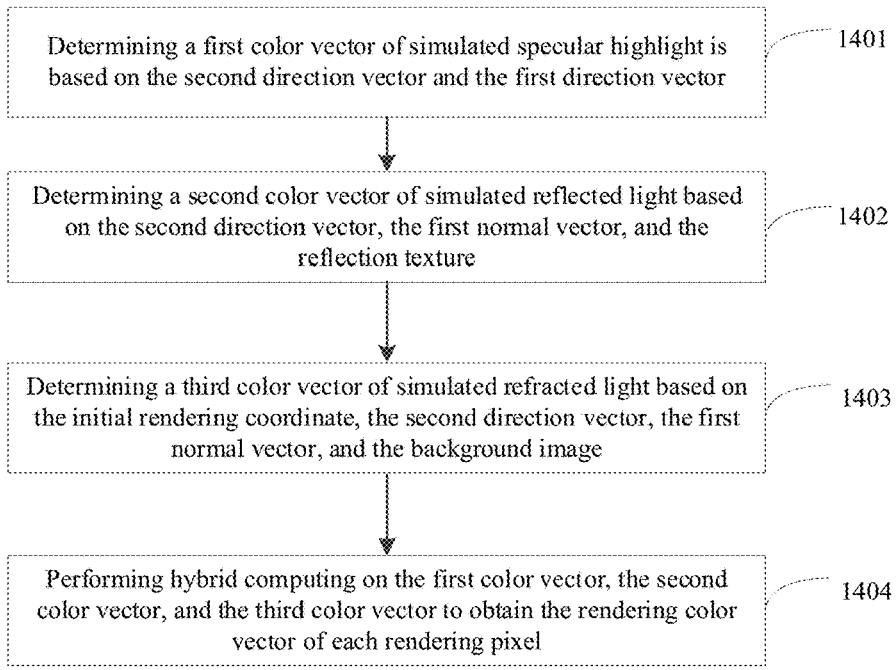
FIG. 14 is a flowchart of another image rendering method provided in an embodiment of the present disclosure.

In some possible embodiments, as shown in FIG. 14, computing the rendering color vector of each rendering pixel based on the first normal vector, the first direction vector, and the second direction vector includes the following steps.

Step 1401, determining a first color vector of simulated specular highlight is based on the second direction vector and the first direction vector.

For example, after the first direction vector and the first direction vector are summed, a normalized value result after the summing is taken as the first color vector.

For another example, a vector sum of the second direction vector and the first direction vector is computed, and after the normalization of the vector sum, a first operation value of a first preset power of a normalization result is computed, and a product of the first operation value and a preset first parameter value is computed to obtain the first color vector, where the preset first parameter value and the first preset power may be both calibrated based on experimental data.

By way of example, when the first parameter value is 800 and the preset power is 600, the first color vector may be computed by the following formula (6), where C2 represents a first color component; L represents the first direction vector; V represents the second direction vector; and G ( ) represents a preset vector normalization processing function.

$$C2=(G(L+V)^{600})\times 800 \quad (6)$$

Step 1402, determining a second color vector of simulated reflected light based on the second direction vector, the first normal vector, and the reflection texture.

The reflection texture is a preset texture image matching the background image. For example, when the background image is white floor, the preset reflection texture may be the preset texture image after reflection of white light. That is, the corresponding reflection texture is obtained by matching the color of the background image with a database.

In some possible implementations, after a refracted light direction vector in the world space is computed based on the first normal vector and the second direction vector according to a Fresnel transformation theorem, coordinate values are normalized based on the refracted light direction vector, and a normalized value is taken as a sampling coordinate value to sample the texture vector in the reflection texture. Thus, the texture vector in the reflection texture is taken as the second color vector.

In some other implementations, a third direction vector is determined based on the first normal vector and the second direction vector. Based on the Fresnel transformation theorem, the third direction vector may be construed as a refracted light direction in the world space. Since the color of the reflected light is affected by the refracted light, in the present embodiment, third sampling coordinate is determined based on the third direction vector, and a texture vector of the reflection texture under the third sampling coordinate is obtained as the second color vector.

In this implementation, the third direction vector may be directly used to generate the corresponding third sampling coordinate based on a coordinate normalization function. When the generation function for each initial rendering image is the trigonometric sin function, the corresponding second color component may also be obtained according to the following formula (7), where U4 represents the third sampling coordinate; D1 represents the third direction vector; D1·x represents the X-component of D1; and D1·z represents the Z-component of D1. In addition, 0.32 and 0.16 are parameter values with good effect calibrated based on experimental data. In practical use, other parameter values may be used instead according to specific scenarios.

$$U4=((\arccos(D1·x)+(\arccos(D1·z))\times 0.16, \arccos(D1·z)\times 0.32)) \quad (7)$$

Step 1403, determining a third color vector of simulated refracted light based on the initial rendering coordinate, the second direction vector, the first normal vector, and the background image.

In the present embodiment, since the background image is associated with the refracted light, the background image is taken as a background texture to generate the corresponding third color vector.

In some possible embodiments, a capturing distance between each rendering pixel and the camera may be determined. The capturing distance may be obtained as follows: image coordinate of each rendering pixel in the background image are transformed into world coordinate based on an internal parameter and an external parameter of the camera to obtain a corresponding depth value, and the depth value is taken as the corresponding capturing distance. The transformation from the image coordinate to the world coordinate is the prior art, which will not be described in detail here.

Then, a product of the second direction vector and the first normal vector is computed to obtain a fourth normal vector. Thus, the fourth normal vector is determined together by the line-of-sight direction and the light direction, guaranteeing the realistic effect of the refracted light color determined subsequently based on the fourth normal vector. Further, since specular reflection occurs in the tangent plane of a target model obtained by updating the rendering coordinate of the initial model, a component value of the fourth normal vector in a preset plane is obtained. For example, a component value in the XY plane is obtained.

Further, the fourth normal vector and a preset second parameter value are summed to obtain a first sum value, and a first product value of the first sum value and the capturing distance is computed, where the second parameter value may be tagged according to the experimental effect, which will not be limited here. In the present embodiment, the capturing distance, namely a distance of the line of sight from a rendering pixel, is further introduced into the first product value, further guaranteeing the realistic effect of the third color component.

After the first product value is obtained, a ratio of a preset third parameter value to the first product value is computed. The third parameter value may be tagged according to the experimental effect, which will not be limited here. Then, a second product value of the ratio and the component value is computed to further perform transformation of the related vector based on the coordinate space. After the second product value is obtained, the second product value and the initial rendering coordinate is summed to obtain fourth sampling coordinate, and a color vector of the background image on the fourth sampling coordinate is obtained as the third color vector. Thus, the third color vector of the simulated refracted light is determined together by the background image, the line-of-sight direction, the implementation distance, and the light direction.

In some possible implementations of the present embodiment, the corresponding third color vector may be obtained by computing by the following formula (8), where U5 represents the third color vector; d represents the capturing distance; N s represents the first normal vector; V represents the second direction vector; U0 represents the initial rendering coordinate; the third parameter value is 0.55; and the second parameter value is 0.3.

$$U5 = U0 + \frac{0.55}{d \times (N_s \times V + 0.3)} \times (V \times N_s) \cdot xy \quad (8)$$

Step 1404, performing hybrid computing on the first color vector, the second color vector, and the third color vector to obtain the rendering color vector of each rendering pixel.

Since the first color vector simulates the specular highlight, while the second color vector simulates the reflected light and the third color vector simulates the refracted light, hybrid computing is performed on the first color vector, the second color vector, and the third color vector to obtain the rendering color vector of each rendering pixel. Color rendering under the Fresnel effect is realized and the realistic effect after rendering is further improved.

Figure 15:
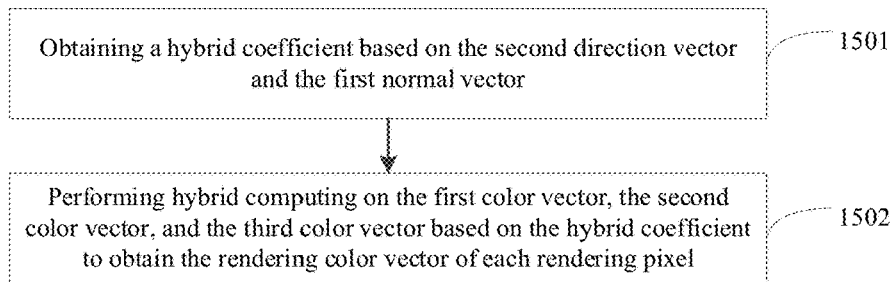
FIG. 15 is a flowchart of another image rendering method provided in an embodiment of the present disclosure.

In some possible implementations, as shown in FIG. 15, performing hybrid computing on the first color vector, the second color vector, and the third color vector to obtain the rendering color vector of each rendering pixel includes the following steps.

Step 1501, obtaining a hybrid coefficient based on the second direction vector and the first normal vector.

The hybrid coefficient is obtained based on the second direction vector and the first normal vector. The hybrid coefficient may be construed as a Fresnel hybrid coefficient.

In some possible implementations, a product value of the second direction vector and the first normal vector is computed to obtain a power of the product value as the hybrid coefficient. That is, the corresponding hybrid coefficient is generated in combination with the line-of-sight direction and the light direction. The Fresnel hybrid coefficient is determined together by the major influencing factors of the line of sight and the amount of light in the Fresnel effect. The power may be calibrated according to the experimental effect, which may be any number.

In some possible implementations, a third product value of the second direction vector and the first normal vector is computed, and a first difference value between a preset fourth parameter value and the third product value is computed, where the fourth parameter value may be tagged according to the experimental effect, which will not be limited here. Then, a second operation value of a second preset power of the first difference value is computed, and a fourth product value of a preset fifth parameter value and the second operation value is obtained, where the second preset power and the fifth parameter value may be both tagged according to the experimental effect, which will not be limited here. The fourth product value and a preset sixth parameter value are summed to obtain the hybrid coefficient. The sixth parameter value may be tagged according to the experimental effect, which will not be limited here.

In some possible embodiments of the present implementation, the hybrid coefficient may be computed by the following formula (9), where 1 is the fourth parameter value; 0.91 is the fifth parameter value; the second preset power is 5; the sixth parameter value is 0.09; F represents the hybrid coefficient; V represents the second direction vector; and N s represents the first direction vector.

$$F=0.09+0.91\times(1-V\times N_s)^5 \quad (9)$$

Step 1502, performing hybrid computing on the first color vector, the second color vector, and the third color vector based on the hybrid coefficient to obtain the rendering color vector of each rendering pixel.

In the present embodiment, hybrid computing is performed on the first color vector, the second color vector, and third color vector based on the hybrid coefficient to obtain rendering color vector of each rendering pixel. For the rendering color vector, the influences of disturbing factors such as the specular reflection, refracted light reflection, and reflected light are taken into account together, improving the realistic effect of the rendering color.

In some possible implementations, the first color vector, the second color vector, and the third color vector are summed, and a product value of a sum value obtained by the summing and the hybrid coefficient is taken as the corresponding rendering color vector.

In some other possible implementations, a second difference value between a preset seventh parameter value and the hybrid coefficient is computed; a product of the second difference value and the third color vector is computed to obtain a fifth product value; the first color vector and the second color vector are summed to obtain a second sum value, and a sixth product value of the second sum value and the hybrid coefficient is computed; and the fifth product value and the sixth product value are summed to obtain the rendering color vector of each rendering pixel, where the seventh parameter value in the present embodiment may be tagged according to the experimental effect, which will not be limited here. Thus, in the present embodiment, hybrid weights of different color vectors are taken into full consideration to compute the rendering color vector.

In some possible implementation of the present implementation, the rendering color vector may be computed by the following formula (10), where F represents the hybrid coefficient; C3 represents the third color vector; C1 represents the second color vector; C2 represents the first color vector; the seventh parameter value is 1; and C represents a hybrid color vector.

$$C=(1-F)\times C3+F(C1+C2) \quad (10)$$

Thus, based on the foregoing embodiments, Fresnel mixing of refracted light, reflected light, and specular highlight is realized based on the hybrid coefficient in the present embodiment, and the rendering effect is caused to be clear at a short distance and fuzzy at a long distance. When rendering with water waves, the reflection by the water waves at a short distance is not obvious and is visually clear, and the reflection at a long distance is obvious and is visually fuzzy. Thus, the realistic effect of water surface waving can be further improved.

To sum up, according to the image rendering method in the embodiments of the present disclosure, the rendering color of each rendering pixel is determined in combination with the Fresnel effect, and the color of the rendering pixel is simulated under the action of the refracted light, the reflected light, and the specular highlight, further improving the realistic effect of rendering.

Figure 16:
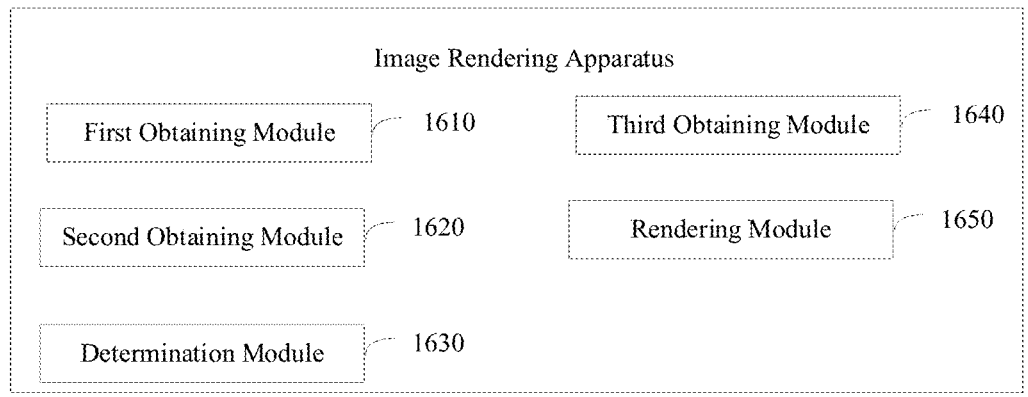
FIG. 16 is a structural schematic diagram of an image rendering apparatus provided in an embodiment of the present disclosure.

FIG. 16 is a structural schematic diagram of an image rendering apparatus provided in an embodiment of the present disclosure. The image rendering apparatus may be implemented by software and/or hardware and may be generally integrated in an electronic device. As shown in FIG. 16, the image rendering apparatus includes a first obtaining module 1610, a second obtaining module 1620, a determination module 1630, a third obtaining module 1640, and a rendering module 1650.

The first obtaining module 1610 is configured to determine an initial rendering video stream for a background image captured in advance, where the initial rendering video stream includes a plurality of initial rendering images and each initial rendering image is generated based on a reflection texture and a map texture.

The second obtaining module 1620 is configured to obtain initial rendering coordinate of each rendering pixel in each initial rendering image, and obtain a rendering moment of each initial rendering image in the initial rendering video stream.

The determination module 1630 is configured to determine an amount of noise of each rendering pixel at the rendering moment based on the initial rendering coordinate, a preset noise texture, and the rendering moment.

The third obtaining module 1640 is configured to perform computing on the amount of noise according to a preset algorithm to obtain target rendering coordinate of each rendering pixel.

The rendering module 1650 is configured to update the initial rendering coordinate of each rendering pixel in each initial rendering image based on the target rendering coordinate to obtain a target rendering image, and render the background image based on a target rendering video stream composed of all target rendering images.

The image rendering apparatus provided in the embodiment of the present disclosure may perform the image rendering method provided in any embodiment of the present disclosure and has corresponding functional modules for performing the method and corresponding beneficial effects.

In order to implement the above embodiments, the present disclosure further provide a computer-readable storage medium, on which a computer program is stored, wherein the computer program is configured to perform the image rendering method in the above embodiments.

Figure 17:
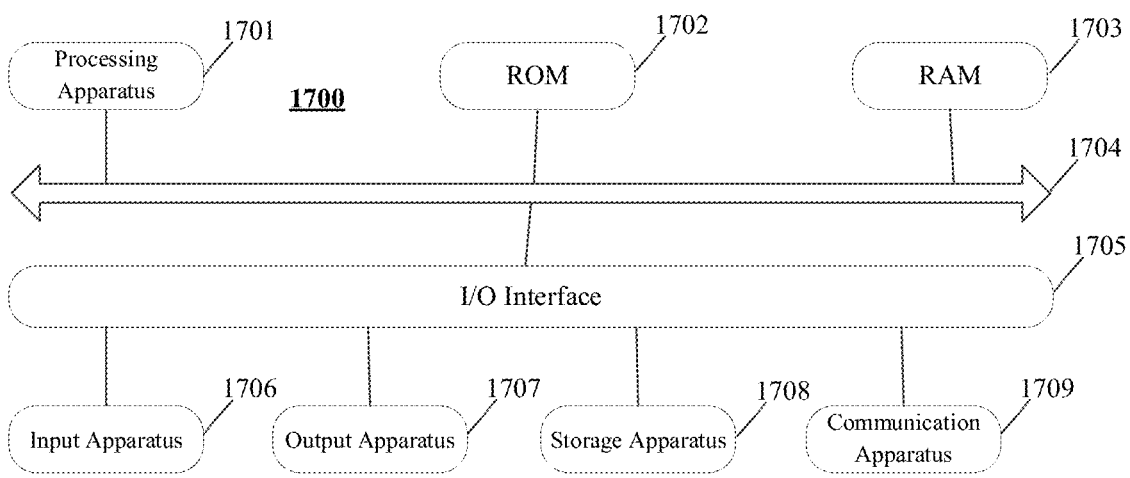
FIG. 17 is a structural schematic diagram of an electronic device provided in an embodiment of the present disclosure.

FIG. 17 is a structural schematic diagram of an electronic device provided in an embodiment of the present disclosure.

FIG. 17 is specifically referred below, and it shows the structure schematic diagram suitable for achieving the electronic device 1700 in the embodiment of the present disclosure. The electronic device 1700 in the embodiment of the present disclosure may include but not be limited to a mobile terminal such as a mobile phone, a notebook computer, a digital broadcasting receiver, a personal digital assistant (PDA), a PAD (tablet computer), a portable multimedia player (PMP), a vehicle terminal (such as a vehicle navigation terminal), and a fixed terminal such as a digital television (TV) and a desktop computer. The electronic device shown in FIG. 17 is only an example and should not impose any limitations on the functions and use scopes of the embodiments of the present disclosure.

As shown in FIG. 17, the electronic device 1700 may include a processing apparatus (such as a central processing unit, and a graphics processor) 1701, it may execute various appropriate actions and processes according to a program stored in a read-only memory (ROM) 1702 or a program loaded from a storage apparatus 1708 to a random access memory (RAM) 1703. In RAM 1703, various programs and data required for operations of the electronic device 1700 are also stored. The processing apparatus 1701, ROM 1702, and RAM 1703 are connected to each other by a bus 1704. An input/output (I/O) interface 1705 is also connected to the bus 1704.

Typically, the following apparatuses may be connected to the I/O interface 1705: an input apparatus 1706 such as a touch screen, a touchpad, a keyboard, a mouse, a camera, a microphone, an accelerometer, and a gyroscope; an output apparatus 1707 such as a liquid crystal display (LCD), a loudspeaker, and a vibrator; a storage apparatus 1708 such as a magnetic tape, and a hard disk drive; and a communication apparatus 1709. The communication apparatus 1709 may allow the electronic device 1700 to wireless-communicate or wire-communicate with other devices so as to exchange data. Although FIG. 17 shows the electronic device 1700 with various apparatuses, it should be understood that it is not required to implement or possess all the apparatuses shown. Alternatively, it may implement or possess the more or less apparatuses.

Specifically, according to the embodiment of the present disclosure, the process described above with reference to the flow diagram may be achieved as a computer software program. For example, an embodiment of the present disclosure includes a computer program product, it includes a computer program loaded on a non-transient computer-readable medium, and the computer program contains a program code for executing the method shown in the flow diagram. In such an embodiment, the computer program may be downloaded and installed from the network by the communication apparatus 1709, or installed from the storage apparatus 1708, or installed from ROM 1702. When the computer program is executed by the processing apparatus 1701, the above functions defined in the image rendering method in the embodiments of the present disclosure are executed.

It should be noted that the above computer-readable medium in the present disclosure may be a computer-readable signal medium, a computer-readable storage medium, or any combinations of the two. The computer-readable storage medium may be, for example, but not limited to, a system, an apparatus or a device of electricity, magnetism, light, electromagnetism, infrared, or semiconductor, or any combinations of the above. More specific examples of the computer-readable storage medium may include but not be limited to: an electric connector with one or more wires, a portable computer magnetic disk, a hard disk drive, a random access memory (RAM), a read-only memory (ROM), an erasable programmable read-only memory (EPROM or flash memory), an optical fiber, a portable compact disk read-only memory (CD-ROM), an optical storage device, a magnetic storage device or any suitable combinations of the above. In the present disclosure, the computer-readable storage medium may be any visible medium that contains or stores a program, and the program may be used by an instruction executive system, apparatus or device or used in combination with it. In the present disclosure, the computer-readable signal medium may include a data signal propagated in a baseband or as a part of a carrier wave, it carries the computer-readable program code. The data signal propagated in this way may adopt various forms, including but not limited to an electromagnetic signal, an optical signal, or any suitable combinations of the above. The computer-readable signal medium may also be any computer-readable medium other than the computer-readable storage medium, and the computer-readable signal medium may send, propagate, or transmit the program used by the instruction executive system, apparatus or device or in combination with it. The program code contained on the computer-readable medium may be transmitted by using any suitable medium, including but not limited to: a wire, an optical cable, a radio frequency (RF) or the like, or any suitable combinations of the above.

In some implementation modes, a client and a server may be communicated by using any currently known or future-developed network protocols such as a HyperText Transfer Protocol (HTTP), and may interconnect with any form or medium of digital data communication (such as a communication network). Examples of the communication network include a local area network ("LAN"), a wide area network ("WAN"), an internet work (such as the Internet), and an end-to-end network (such as an ad hoc end-to-end network), as well as any currently known or future-developed networks.

The above-mentioned computer-readable medium may be included in the above-mentioned electronic device, or may also exist alone without being assembled into the electronic device.

A computer-readable medium may carry one or more programs which, when executed by the electronic device, cause the electronic device to: determine an initial rendering video stream for a background image captured in advance, where the initial rendering video stream includes a plurality of initial rendering images and each initial rendering image is generated based on a reflection texture and a map texture; obtain initial rendering coordinate of each rendering pixel in each initial rendering image, and obtain a rendering moment of each initial rendering image in the initial rendering video stream; determine an amount of noise of each rendering pixel at the rendering moment based on the initial rendering coordinate, a preset noise texture, and the rendering moment, and perform computing on the amount of noise according to a preset algorithm to obtain target rendering coordinate of each rendering pixel; and finally, update the initial rendering coordinate of each rendering pixel in each initial rendering image based on the target rendering coordinate to obtain a target rendering image, and render the background image based on a target rendering video stream composed of all target rendering images. Thus, the amount of noise is generated based on the noise texture and the rendering moment of the rendering image, and the rendering coordinate is determined based on the amount of noise as a random variable. Thus, a realistic image rendering effect is achieved.

The computer program codes for performing the operations of the present disclosure may be written in one or more programming languages or a combination thereof. The above-mentioned programming languages include but are not limited to object-oriented programming languages such as Java, Smalltalk, C++, and also include conventional procedural programming languages such as the "C" programming language or similar programming languages. The program code may be executed entirely on the user's computer, partly on the user's computer, as a stand-alone software package, partly on the user's computer and partly on a remote computer, or entirely on the remote computer or server. In the scenario related to the remote computer, the remote computer may be connected to the user's computer through any type of network, including a local area network (LAN) or a wide area network (WAN), or the connection may be made to an external computer (for example, through the Internet using an Internet service provider).

The flow diagrams and the block diagrams in the drawings show possibly achieved system architectures, functions, and operations of systems, methods, and computer program products according to various embodiments of the present disclosure. At this point, each box in the flow diagram or the block diagram may represent a module, a program segment, or a part of a code, the module, the program segment, or a part of the code contains one or more executable instructions for achieving the specified logical functions. It should also be noted that in some alternative implementations, the function indicated in the box may also occur in a different order from those indicated in the drawings. For example, two consecutively represented boxes may actually be executed basically in parallel, and sometimes it may also be executed in an opposite order, this depends on the function involved. It should also be noted that each box in the block diagram and/or the flow diagram, as well as combinations of the boxes in the block diagram and/or the flow diagram, may be achieved by using a dedicated hardware-based system that performs the specified function or operation, or may be achieved by using combinations of dedicated hardware and computer instructions.

The involved units described in the embodiments of the present disclosure may be achieved by a mode of software, or may be achieved by a mode of hardware. Herein, the name of the unit does not constitute a limitation for the unit itself in some cases.

The functions described above in this article may be at least partially executed by one or more hardware logic components. For example, non-limiting exemplary types of the hardware logic component that may be used include: a field programmable gate array (FPGA), an application specific integrated circuit (ASIC), an application specific standard product (ASSP), a system on chip (SOC), a complex programmable logic device (CPLD) and the like.

In the context of the present disclosure, the machine-readable medium may be a visible medium, and it may contain or store a program for use by or in combination with an instruction executive system, apparatus, or device. The machine-readable medium may be a machine-readable signal medium or a machine-readable storage medium. The machine-readable medium may include but not limited to an electronic, magnetic, optical, electromagnetic, infrared, or semiconductor system, apparatus, or device, or any suitable combinations of the above. More specific examples of the machine-readable storage medium may include an electric connector based on one or more wires, a portable computer disk, a hard disk drive, RAM, ROM, EPROM (or a flash memory), an optical fiber, CD-ROM, an optical storage device, a magnetic storage device, or any suitable combinations of the above.

According to one or more embodiments of the present disclosure, the image rendering method includes the following steps: determining an initial rendering video stream for a background image captured in advance, wherein the initial rendering video stream comprises a plurality frames of initial rendering images and each frame of initial rendering image is generated based on a reflection texture and a map texture; obtaining an initial rendering coordinate of each rendering pixel in each frame of initial rendering image, and obtaining a rendering moment of each initial rendering image in the initial rendering video stream; determining an amount of noise of each rendering pixel at the rendering moment based on the initial rendering coordinate, a preset noise texture, and the rendering moment, and performing computing on the amount of noise according to a preset algorithm to obtain a target rendering coordinate of each rendering pixel; and updating the initial rendering coordinate of each rendering pixel in each initial rendering image based on the target rendering coordinate to obtain a target rendering image, and rendering the background image based on a target rendering video stream composed of all target rendering images.

According to one or more embodiments of the present disclosure, in the image rendering method by the present disclosure, before rendering the background image based on a target rendering video stream composed of all target rendering images, the method further comprises: obtaining a tangent vector and a binormal vector of each rendering pixel in each initial rendering image in a world space; performing computing on the map texture, the target rendering coordinate, the rendering moment, the binormal vector, and the tangent vector to obtain a first normal vector of each rendering pixel in the world space; obtaining a first direction vector of simulated light emission of each rendering pixel and a second direction vector between each rendering pixel and a camera capturing the background image; computing a rendering color vector of each rendering pixel based on the first normal vector, the first direction vector and the second direction vector; and rendering a color of a corresponding rendering pixel in the target rendering image based on the rendering color vector.

According to one or more embodiments of the present disclosure, in the image rendering method by the present disclosure, the performing computing on the map texture, the target rendering coordinate, the rendering moment, the binormal vector, and the tangent vector to obtain a first normal vector of each rendering pixel in the world space comprises: obtaining a first sampling coordinate and a second sampling coordinate based on the target rendering coordinate and the rendering moment; obtaining a first map texture vector and a second map texture vector of the map texture at the first sampling coordinate and the second sampling coordinate, respectively; and obtaining the first normal vector of each rendering pixel in the world space based on the binormal vector, the tangent vector, the first map texture vector, and the second map texture vector.

According to one or more embodiments of the present disclosure, in the image rendering method by the present disclosure, the obtaining the first normal vector of each rendering pixel in the world space based on the binormal vector, the tangent vector, the first map texture vector, and the second map texture vector comprises: computing a mean value of the first map texture vector and the second map texture vector to obtain a second normal vector in a tangent space of the map texture; performing preset normalization computing on the binormal vector and the tangent vector to obtain a third normal vector in the world space; obtaining a vector transformation matrix based on the binormal vector, the tangent vector, and the third normal vector; and computing a product of the vector transformation matrix and the second normal vector to obtain the first normal vector.

According to one or more embodiments of the present disclosure, in the image rendering method by the present disclosure, the computing a rendering color vector of each rendering pixel based on the first normal vector, the first direction vector, and the second direction vector comprises: determining a first color vector of simulated specular highlight based on the second direction vector and the first direction vector; determining a second color vector of simulated reflected light based on the second direction vector, the first normal vector, and the reflection texture; determining a third color vector of simulated refracted light based on the initial rendering coordinate, the second direction vector, the first normal vector, and the background image; and performing hybrid computing on the first color vector, the second color vector, and the third color vector to obtain the rendering color vector of each rendering pixel.

According to one or more embodiments of the present disclosure, in the image rendering method by the present disclosure, the determining a first color vector of simulated specular highlight based on the second direction vector and the first direction vector comprises: computing a vector sum of the second direction vector and the first direction vector; after performing a preset normalization computing on the vector sum, computing a first preset power of a normalization computing result to obtain a first operation value; and computing a product of the first operation value and a preset first parameter value to obtain the first color vector.

According to one or more embodiments of the present disclosure, in the image rendering method by the present disclosure, the determining a second color vector of simulated reflected light based on the second direction vector, the first normal vector, and the reflection texture comprises: determining a third direction vector based on the first normal vector and the second direction vector; and determining a third sampling coordinate based on the third direction vector, and obtaining a texture vector of the reflection texture at the third sampling coordinate as the second color vector.

According to one or more embodiments of the present disclosure, in the image rendering method by the present disclosure, the determining a third color vector of simulated refracted light based on the initial rendering coordinate, the second direction vector, the first normal vector, and the background image comprises: determining a capturing distance between each rendering pixel and the camera; computing a product of the second direction vector and the first normal vector to obtain a fourth normal vector, and obtaining a component value of the fourth normal vector in a preset plane; summing the fourth normal vector and a preset second parameter value to obtain a first sum value, and computing a first product value of the first sum value and the capturing distance; computing a ratio of a preset third parameter value to the first product value, and computing a second product value of the ratio and the component value; and summing the second product value and the initial rendering coordinate to obtain a fourth sampling coordinate, and obtaining a color vector of the background image at the fourth sampling coordinate as the third color vector.

According to one or more embodiments of the present disclosure, in the image rendering method by the present disclosure, the performing hybrid computing on the first color vector, the second color vector, and the third color vector to obtain the rendering color vector of each rendering pixel comprises: obtaining a hybrid coefficient based on the second direction vector and the first normal vector; and performing hybrid computing on the first color vector, the second color vector, and the third color vector based on the hybrid coefficient to obtain the rendering color vector of each rendering pixel.

According to one or more embodiments of the present disclosure, in the image rendering method by the present disclosure, the obtaining a hybrid coefficient based on the second direction vector and the first normal vector comprises: obtaining a third product value of the second direction vector and the first normal vector, and computing a first difference value between a preset fourth parameter value and the third product value; computing a second operation value of a second preset power of the first difference value, and obtaining a fourth product value of a preset fifth parameter value and the second operation value; and summing the fourth product value and a preset sixth parameter value to obtain the hybrid coefficient.

According to one or more embodiments of the present disclosure, in the image rendering method by the present disclosure, the performing hybrid computing on the first color vector, the second color vector, and the third color vector based on the hybrid coefficient to obtain the rendering color vector of each rendering pixel comprises: computing a second difference value between a preset seventh parameter value and the hybrid coefficient; performing multiplication computing on the second difference value and the third color vector to obtain a fifth product value; summing the first color vector and the second color vector to obtain a second sum value, and computing a sixth product value of the second sum value and the hybrid coefficient; and summing the fifth product value and the sixth product value to obtain the rendering color vector of each rendering pixel.

According to one or more embodiments of the present disclosure, in the image rendering method by the present disclosure, the determining an amount of noise of each rendering pixel at the rendering moment based on the initial rendering coordinate, a preset noise texture, and the rendering moment comprises: determining a fifth sampling coordinate based on the initial rendering coordinate and the rendering moment; and determining in the noise texture a noise texture vector corresponding to the fifth sampling coordinate as the amount of noise.

According to one or more embodiments of the present disclosure, the performing computing on the amount of noise according to a preset algorithm to obtain target rendering coordinate of each rendering pixel comprises: obtaining a first direction vector of preset simulated light emission of each rendering pixel, a second direction vector between each rendering pixel and a camera capturing the background image, and a binormal vector of each rendering pixel in a world space; and performing computing based on the initial rendering coordinate, the first direction vector, the second direction vector, the binormal vector, and the amount of noise to obtain the target rendering coordinate of each rendering pixel.

According to one or more embodiments of the present disclosure, in the image rendering method by the present disclosure, the performing computing based on the initial rendering coordinate, the first direction vector, the second direction vector, the binormal vector, and the amount of noise to obtain the target rendering coordinate of each rendering pixel comprises: computing a seventh product value of the binormal vector with the first direction vector and an eighth product value of the binormal vector with the second direction vector; computing a first modulus value of the seventh product value and a second modulus value of the eighth product value, and summing the first modulus value and the second modulus value to obtain a third sum value; obtaining a function value corresponding to the third sum value according to a generation function for each initial rendering image; and computing a ninth product value of the function value, the amount of noise, and a preset seventh parameter value, and summing the ninth product value and the initial rendering coordinate to obtain the target rendering coordinate.

According to one or more embodiments of the present disclosure, the present disclosure provides an image rendering apparatus, comprising: a first obtaining module configured to determine an initial rendering video stream for a background image captured in advance, wherein the initial rendering video stream comprises a plurality of initial rendering images and each initial rendering image is generated based on a reflection texture and a map texture; a second obtaining module configured to obtain an initial rendering coordinate of each rendering pixel in each initial rendering image, and obtain a rendering moment of each initial rendering image in the initial rendering video stream; a determination module configured to determine an amount of noise of each rendering pixel at the rendering moment based on the initial rendering coordinate, a preset noise texture, and the rendering moment; a third obtaining module configured to perform computing on the amount of noise according to a preset algorithm to obtain a target rendering coordinate of each rendering pixel; and a rendering module configured to update the initial rendering coordinate of each rendering pixel in each initial rendering image based on the target rendering coordinate to obtain a target rendering image, and render the background image based on a target rendering video stream composed of all target rendering images.

According to one or more embodiments of the present disclosure, the image rendering apparatus provided in the present disclosure further includes: a fourth obtaining module configured to obtain a tangent vector of each rendering pixel in each initial rendering image in a world space; a fifth obtaining module configured to perform computing on the map texture, the target rendering coordinate, the rendering moment, the binormal vector, and the tangent vector to obtain a first normal vector of each rendering pixel in the world space; a computing module configured to compute a rendering color vector of each rendering pixel based on the first normal vector, the first direction vector, and the second direction vector; and the rendering module further configured to render a color of a corresponding rendering pixel in the target rendering image based on the rendering color vector.

According to one or more embodiments of the present disclosure, in the image rendering apparatus provided in the present disclosure, the fifth obtaining module is specifically configured to: obtain first sampling coordinate and second sampling coordinate based on the target rendering coordinate and the rendering moment; obtain a first map texture vector and a second map texture vector of the map texture at the first sampling coordinate and the second sampling coordinate, respectively; and obtain the first normal vector of each rendering pixel in the world space based on the binormal vector, the tangent vector, the first map texture vector, and the second map texture vector.

According to one or more embodiments of the present disclosure, in the image rendering apparatus provided in the present disclosure, the fifth obtaining module is specifically configured to: perform preset normalization computing on the binormal vector and the tangent vector to obtain a third normal vector in the world space; obtain a vector transformation matrix based on the binormal vector, the tangent vector, and the third normal vector; and compute a product of the vector transformation matrix and the second normal vector to obtain the first normal vector.

According to one or more embodiments of the present disclosure, in the image rendering apparatus provided in the present disclosure, the computing module is specifically configured to: determine a first color vector of simulated specular highlight based on the second direction vector and the first direction vector; determine a second color vector of simulated reflected light based on the second direction vector, the first normal vector, and the reflection texture; determine a third color vector of simulated refracted light based on the initial rendering coordinate, the second direction vector, the first normal vector, and the background image; and perform hybrid computing on the first color vector, the second color vector, and the third color vector to obtain the rendering color vector of each rendering pixel.

According to one or more embodiments of the present disclosure, in the image rendering apparatus provided in the present disclosure, the computing module is specifically configured to: compute a vector sum of the second direction vector and the first direction vector; after performing the preset normalization computing on the vector sum, compute a first preset power of a normalization computing result to obtain a first operation value; and compute a product of the first operation value and a preset first parameter value to obtain the first color vector.

According to one or more embodiments of the present disclosure, in the image rendering apparatus provided in the present disclosure, the computing module is specifically configured to: determine a third direction vector based on the first normal vector and the second direction vector; determine third sampling coordinate based on the third direction vector, and obtain a texture vector of the reflection texture under the third sampling coordinate as the second color vector; determine a capturing distance between each rendering pixel and the camera; compute a product of the second direction vector and the first normal vector to obtain a fourth normal vector, and obtain a component value of the fourth normal vector in a preset plane; sum the fourth normal vector and a preset second parameter value to obtain a first sum value, and compute a first product value of the first sum value and the capturing distance; compute a ratio of a preset third parameter value to the first product value, and compute a second product value of the ratio and the component value; and sum the second product value and the initial rendering coordinate to obtain fourth sampling coordinate, and obtain a color vector of the background image on the fourth sampling coordinate as the third color vector.

According to one or more embodiments of the present disclosure, in the image rendering apparatus provided in the present disclosure, the computing module is specifically configured to: obtain a hybrid coefficient based on the second direction vector and the first normal vector; and perform hybrid computing on the first color vector, the second color vector, and the third color vector based on the hybrid coefficient to obtain the rendering color vector of each rendering pixel.

According to one or more embodiments of the present disclosure, in the image rendering apparatus provided in the present disclosure, the computing module is specifically configured to: obtain a third product value of the second direction vector and the first normal vector, and compute a first difference value between a preset fourth parameter value and the third product value; compute a second operation value of a second preset power of the first difference value, and obtain a fourth product value of a preset fifth parameter value and the second operation value; and sum the fourth product value and a preset sixth parameter value to obtain the hybrid coefficient.

According to one or more embodiments of the present disclosure, in the image rendering apparatus provided in the present disclosure, the computing module is specifically configured to: compute a second difference value between a preset seventh parameter value and the hybrid coefficient; perform multiplication computing on the second difference value and the third color vector to obtain a fifth product value; sum the first color vector and the second color vector to obtain a second sum value, and compute a sixth product value of the second sum value and the hybrid coefficient; and sum the fifth product value and the sixth product value to obtain the rendering color vector of each rendering pixel.

According to one or more embodiments of the present disclosure, in the image rendering apparatus provided in the present disclosure, the determination module is specifically configured to: determine fifth sampling coordinate based on the initial rendering coordinate and the rendering moment; and determine in the noise texture a noise texture vector corresponding to the fifth sampling coordinate as the amount of noise.

According to one or more embodiments of the present disclosure, in the image rendering apparatus provided in the present disclosure, the determination module is specifically configured to: obtain the first direction vector of preset simulated light emission of each rendering pixel, the second direction vector between each rendering pixel and the camera capturing the background image, and the binormal vector of each rendering pixel in the world space; and perform computing based on the initial rendering coordinate, the first direction vector, the second direction vector, the binormal vector, and the amount of noise to obtain the target rendering coordinate of each rendering pixel.

According to one or more embodiments of the present disclosure, in the image rendering apparatus provided in the present disclosure, the determination module is specifically configured to: compute a seventh product value and an eighth product value of the binormal vector with the first direction vector and the second direction vector, respectively; compute a first modulus value and a second modulus value of the seventh product value and the eighth product value, respectively, and sum the first modulus value and the second modulus value to obtain a third sum value; obtain a function value corresponding to the third sum value according to a generation function for each initial rendering image; and compute a ninth product value of the function value, the amount of noise, and the preset seventh parameter value, and sum the ninth product value and the initial rendering coordinate to obtain the target rendering coordinate.

According to one or more embodiments of the present disclosure, the present disclosure provides an electronic device comprising a processor and a memory configured to store an instruction executable by the processor; and the processor is configured to read the executable instruction from the memory and exit the instruction to implement any one image rendering method provided by the present disclosure.

According to one or more embodiments of the present disclosure, the present disclosure provides a computer-readable storage medium, and a computer program is stored on the computer-readable storage medium, and is used to implement the image rendering method provided in the foregoing embodiments.

The foregoing are merely descriptions of the preferred embodiments of the present disclosure and the explanations of the technical principles involved. It will be appreciated by those skilled in the art that the scope of the disclosure involved herein is not limited to the technical solutions formed by a specific combination of the technical features described above, and shall cover other technical solutions formed by any combination of the technical features described above or equivalent features thereof without departing from the concept of the present disclosure. For example, the technical features described above may be mutually replaced with the technical features having similar functions disclosed herein (but not limited thereto) to form new technical solutions.

In addition, while operations have been described in a particular order, it shall not be construed as requiring that such operations are performed in the stated specific order or sequence. Under certain circumstances, multitasking and parallel processing may be advantageous. Similarly, while some specific implementation details are included in the above discussions, these shall not be construed as limitations to the present disclosure. Some features described in the context of a separate embodiment may also be combined in a single embodiment. Rather, various features described in the context of a single embodiment may also be implemented separately or in any appropriate sub-combination in a plurality of embodiments.

Although the present subject matter has been described in a language specific to structural features and/or logical method acts, it will be appreciated that the subject matter defined in the appended claims is not necessarily limited to the particular features and acts described above. Rather, the particular features and acts described above are merely exemplary forms for implementing the claims.

The invention claimed is:

1. An image rendering method, comprising:
   determining an initial rendering video stream for a background image captured in advance, wherein the initial rendering video stream comprises a plurality frames of initial rendering images and each frame of initial rendering image is generated based on a reflection texture and a map texture;
   obtaining an initial rendering coordinate of each rendering pixel in each frame of initial rendering image, and obtaining a rendering moment of each initial rendering image in the initial rendering video stream;
   determining an amount of noise of each rendering pixel at the rendering moment based on the initial rendering coordinate, a preset noise texture, and the rendering moment, and performing computing on the amount of noise according to a preset algorithm to obtain a target rendering coordinate of each rendering pixel; and
   updating the initial rendering coordinate of each rendering pixel in each initial rendering image based on the target rendering coordinate to obtain a target rendering image, and rendering the background image based on a target rendering video stream composed of all target rendering images.

2. The image rendering method according to claim 1, before rendering the background image based on a target rendering video stream composed of all target rendering images, further comprising:
   obtaining a tangent vector and a binormal vector of each rendering pixel in each initial rendering image in a world space;
   performing computing on the map texture, the target rendering coordinate, the rendering moment, the binormal vector, and the tangent vector to obtain a first normal vector of each rendering pixel in the world space;
   obtaining a first direction vector of simulated light emission of each rendering pixel and a second direction vector between each rendering pixel and a camera capturing the background image;
   computing a rendering color vector of each rendering pixel based on the first normal vector, the first direction vector and the second direction vector; and
   rendering a color of a corresponding rendering pixel in the target rendering image based on the rendering color vector.

3. The image rendering method according to claim 2, wherein the performing computing on the map texture, the target rendering coordinate, the rendering moment, the binormal vector, and the tangent vector to obtain a first normal vector of each rendering pixel in the world space comprises:

obtaining a first sampling coordinate and a second sampling coordinate based on the target rendering coordinate and the rendering moment;

obtaining a first map texture vector and a second map texture vector of the map texture at the first sampling coordinate and the second sampling coordinate, respectively; and obtaining the first normal vector of each rendering pixel in the world space based on the binormal vector, the tangent vector, the first map texture vector, and the second map texture vector.

4. The image rendering method according to claim 3, wherein the obtaining the first normal vector of each rendering pixel in the world space based on the binormal vector, the tangent vector, the first map texture vector, and the second map texture vector comprises:

computing a mean value of the first map texture vector and the second map texture vector to obtain a second normal vector in a tangent space of the map texture;

performing preset normalization computing on the binormal vector and the tangent vector to obtain a third normal vector in the world space;

obtaining a vector transformation matrix based on the binormal vector, the tangent vector, and the third normal vector; and computing a product of the vector transformation matrix and the second normal vector to obtain the first normal vector.

5. The image rendering method according to claim 2, wherein the computing a rendering color vector of each rendering pixel based on the first normal vector, the first direction vector, and the second direction vector comprises:

determining a first color vector of simulated specular highlight based on the second direction vector and the first direction vector;

determining a second color vector of simulated reflected light based on the second direction vector, the first normal vector, and the reflection texture;

determining a third color vector of simulated refracted light based on the initial rendering coordinate, the second direction vector, the first normal vector, and the background image; and performing hybrid computing on the first color vector, the second color vector, and the third color vector to obtain the rendering color vector of each rendering pixel.

6. The image rendering method according to claim 5, wherein the determining a first color vector of simulated specular highlight based on the second direction vector and the first direction vector comprises:

computing a vector sum of the second direction vector and the first direction vector;

after performing a preset normalization computing on the vector sum, computing a first preset power of a normalization computing result to obtain a first operation value; and computing a product of the first operation value and a preset first parameter value to obtain the first color vector.

7. The image rendering method according to claim 5, wherein the determining a second color vector of simulated reflected light based on the second direction vector, the first normal vector, and the reflection texture comprises:

determining a third direction vector based on the first normal vector and the second direction vector; and determining a third sampling coordinate based on the third direction vector, and obtaining a texture vector of the reflection texture at the third sampling coordinate as the second color vector.

8. The image rendering method according to claim 5, wherein the determining a third color vector of simulated refracted light based on the initial rendering coordinate, the second direction vector, the first normal vector, and the background image comprises:

determining a capturing distance between each rendering pixel and the camera;

computing a product of the second direction vector and the first normal vector to obtain a fourth normal vector, and obtaining a component value of the fourth normal vector in a preset plane;

summing the fourth normal vector and a preset second parameter value to obtain a first sum value, and computing a first product value of the first sum value and the capturing distance;

computing a ratio of a preset third parameter value to the first product value, and computing a second product value of the ratio and the component value; and summing the second product value and the initial rendering coordinate to obtain a fourth sampling coordinate, and obtaining a color vector of the background image at the fourth sampling coordinate as the third color vector.

9. The image rendering method according to claim 5, wherein the performing hybrid computing on the first color vector, the second color vector, and the third color vector to obtain the rendering color vector of each rendering pixel comprises:

obtaining a hybrid coefficient based on the second direction vector and the first normal vector; and performing hybrid computing on the first color vector, the second color vector, and the third color vector based on the hybrid coefficient to obtain the rendering color vector of each rendering pixel.

10. The image rendering method according to claim 9, wherein the obtaining a hybrid coefficient based on the second direction vector and the first normal vector comprises:

obtaining a third product value of the second direction vector and the first normal vector, and computing a first difference value between a preset fourth parameter value and the third product value;

computing a second operation value of a second preset power of the first difference value, and obtaining a fourth product value of a preset fifth parameter value and the second operation value; and summing the fourth product value and a preset sixth parameter value to obtain the hybrid coefficient.

11. The image rendering method according to claim 9, wherein the performing hybrid computing on the first color vector, the second color vector, and the third color vector based on the hybrid coefficient to obtain the rendering color vector of each rendering pixel comprises:

computing a second difference value between a preset seventh parameter value and the hybrid coefficient;

performing multiplication computing on the second difference value and the third color vector to obtain a fifth product value;

summing the first color vector and the second color vector to obtain a second sum value, and computing a sixth product value of the second sum value and the hybrid coefficient; and summing the fifth product value and the sixth product value to obtain the rendering color vector of each rendering pixel.

12. The image rendering method according to claim 1, wherein the determining an amount of noise of each rendering pixel at the rendering moment based on the initial rendering coordinate, a preset noise texture, and the rendering moment comprises:
    determining a fifth sampling coordinate based on the initial rendering coordinate and the rendering moment; and
    determining in the noise texture a noise texture vector corresponding to the fifth sampling coordinate as the amount of noise.

13. The image rendering method according to claim 1, wherein the performing computing on the amount of noise according to a preset algorithm to obtain target rendering coordinate of each rendering pixel comprises:
    obtaining a first direction vector of preset simulated light emission of each rendering pixel, a second direction vector between each rendering pixel and a camera capturing the background image, and a binormal vector of each rendering pixel in a world space; and
    performing computing based on the initial rendering coordinate, the first direction vector, the second direction vector, the binormal vector, and the amount of noise to obtain the target rendering coordinate of each rendering pixel.

14. The image rendering method according to claim 13, wherein the performing computing based on the initial rendering coordinate, the first direction vector, the second direction vector, the binormal vector, and the amount of noise to obtain the target rendering coordinate of each rendering pixel comprises:
    computing a first product value of the binormal vector with the first direction vector and a second product value of the binormal vector with the second direction vector;
    computing a first modulus value of the first product value and a second modulus value of the second product value, and summing the first modulus value and the second modulus value to obtain a sum value;
    obtaining a function value corresponding to the sum value according to a generation function for each initial rendering image; and
    computing a third product value of the function value, the amount of noise, and a preset parameter value, and summing the third product value and the initial rendering coordinate to obtain the target rendering coordinate.

15. An image rendering apparatus, comprising:
    a first obtaining module configured to determine an initial rendering video stream for a background image captured in advance, wherein the initial rendering video stream comprises a plurality of initial rendering images and each initial rendering image is generated based on a reflection texture and a map texture;
    a second obtaining module configured to obtain an initial rendering coordinate of each rendering pixel in each initial rendering image, and obtain a rendering moment of each initial rendering image in the initial rendering video stream;
    a determination module configured to determine an amount of noise of each rendering pixel at the rendering moment based on the initial rendering coordinate, a preset noise texture, and the rendering moment;
    a third obtaining module configured to perform computing on the amount of noise according to a preset algorithm to obtain a target rendering coordinate of each rendering pixel; and
    a rendering module configured to update the initial rendering coordinate of each rendering pixel in each initial rendering image based on the target rendering coordinate to obtain a target rendering image, and render the background image based on a target rendering video stream composed of all target rendering images.

16. An electronic device, comprising:
    a processor; and
    a memory configured to store an instructions executable by the processor,
    wherein the processor is configured to read the executable instruction from the memory and execute the executable instruction to implement the image rendering method according to claim 1.

17. A computer-readable storage medium, on which a computer program is stored, wherein the computer program is configured to perform the image rendering method according to claim 1.

18. A computer program product, comprising a computer program/instruction wherein the image rendering method according to claim 1 is implemented when the computer program/instruction is executed by a processor.

* * * * *